(12) United States Patent
Agarwal et al.

(10) Patent No.: US 12,399,127 B2
(45) Date of Patent: Aug. 26, 2025

(54) AUTOMATED RAMAN SIGNAL COLLECTION DEVICE

(71) Applicant: 14336186 CANADA CORP. (EXCLARO), Mont-Saint-Hilaire (CA)

(72) Inventors: Rajeev Agarwal, Dollard-des-Ormeaux (CA); Jean-Phillipe Tremblay, Montreal (CA); Prashanth Venkataswamy, Montreal (CA); Richard Nguyen Phat The, Montreal (CA)

(73) Assignee: 14336186 CANADA CORP. (EXCLARO), Mont-Saint-Hilaire (CA)

( * ) Notice: Subject to any disclaimer, the term of this patent is extended or adjusted under 35 U.S.C. 154(b) by 74 days.

(21) Appl. No.: 18/020,942

(22) PCT Filed: Aug. 12, 2021

(86) PCT No.: PCT/IB2021/057445
§ 371 (c)(1),
(2) Date: Feb. 12, 2023

(87) PCT Pub. No.: WO2022/034536
PCT Pub. Date: Feb. 17, 2022

(65) Prior Publication Data
US 2023/0296524 A1 Sep. 21, 2023

Related U.S. Application Data

(60) Provisional application No. 63/064,439, filed on Aug. 12, 2020, provisional application No. 63/131,672, filed on Dec. 29, 2020.

(51) Int. Cl.
*G01N 21/65* (2006.01)
*G01N 21/15* (2006.01)

(52) U.S. Cl.
CPC ....... *G01N 21/65* (2013.01); *G01N 2021/155* (2013.01); *G01N 2021/656* (2013.01)

(58) Field of Classification Search
CPC .......... G01J 3/44; G01J 3/0291; G01J 3/2823; G01N 21/65; G01N 2021/155; G01N 2021/152; G01N 2021/656
See application file for complete search history.

(56) References Cited

U.S. PATENT DOCUMENTS 9,150,318 B1 * 10/2015 Sun ......................... A61L 2/007
2008/0103390 A1 5/2008 Contag et al.
(Continued)

FOREIGN PATENT DOCUMENTS

WO 2015/023990 A1 2/2015

OTHER PUBLICATIONS

Pinto Michael et al. Integration of a Raman spectroscopy system to a robotic-assisted surgical system for real-time tissue characterization during radical prostatectomy procedures. Journal of Biomedical Optics, vol. 24, No. 2, Feb. 1, 2019, p. 25001.
(Continued)

*Primary Examiner* — Sang H Nguyen
(74) *Attorney, Agent, or Firm* — Smart & Biggar LP; Carmela De Luca

(57) ABSTRACT

A system for automated collection of Raman spectra from ex-vivo tissue samples is provided. The system may comprise a cartesian robot that moves a detachable Raman probe to points on the ex-vivo tissue sample that have been predetermined through a 3D image of the sample. Accordingly, methods of rapid acquisition of multiple Raman spectra from a heterogeneous tissue sample are provided. The inventive methods consider variable contours of the sample to provide Raman spectra from multiple points while generating optimal coverage of the sample. The inventive
(Continued)

methods include cleaning the Raman probe between acquisitions of Raman spectra from the multiple points.

13 Claims, 22 Drawing Sheets

(56) References Cited

U.S. PATENT DOCUMENTS

| | | | |
|---|---|---|---|
| 2008/0154389 A1* | 6/2008 | Smith | A61B 34/73 |
| | | | 901/41 |
| 2013/0345718 A1* | 12/2013 | Crawford | A61B 34/76 |
| | | | 606/130 |
| 2014/0058406 A1* | 2/2014 | Tsekos | A61B 34/30 |
| | | | 606/130 |
| 2014/0140594 A1 | 5/2014 | Mahadevan-Jansen et al. | |
| 2018/0158661 A1* | 6/2018 | Eberlin | H01J 49/0431 |
| 2018/0180550 A1 | 6/2018 | Franjic et al. | |
| 2019/0175272 A1* | 6/2019 | Khan | A61B 18/203 |
| 2019/0200977 A1* | 7/2019 | Shelton, IV | A61B 34/35 |
| 2019/0391012 A1 | 12/2019 | Kokota et al. | |
| 2020/0015923 A1 | 1/2020 | Scheib et al. | |
| 2020/0015925 A1* | 1/2020 | Scheib | A61B 5/0086 |
| 2020/0134773 A1* | 4/2020 | Pinter | G01N 21/8806 |
| 2020/0194117 A1* | 6/2020 | Krieger | G16H 30/40 |

OTHER PUBLICATIONS

Su L M et al. Augmented Reality During Robot-assisted Laparoscopic Partial Nephrectomy: Towar Real-Time 3D-CT to Stereoscopic Video Registration. Urology, Belle Mead, vol. 73, No. 4, Apr. 1, 2009, pp. 896-900.

* cited by examiner

AUTOMATED RAMAN SIGNAL COLLECTION DEVICE

REFERENCE TO RELATED APPLICATIONS

This is a U.S. National Stage of International Application PCT/IB2021/057445, filed Aug. 12, 2021, which claims the benefit of priority of U.S. Provisional Application 63/064,439, filed Aug. 12, 2020, and U.S. Provisional Application 63/131,672, filed Dec. 29, 2020.

FIELD

The present teachings generally relate to an automated Raman signal collection device.

BACKGROUND

Conventionally, measuring Raman Signal on an ex vivo tissue sample is a difficult task because of the short lifetime of the excised sample, which can be as short as 10 minutes. This has the consequence of limiting the number of measurements one can perform during the tissue sample's useful lifetime. The quality of the Raman spectra can be highly susceptible to the length of post-excision time.

In addition, highly non-uniform sample surfaces require identifying the measurement location with a high level of precision and consistency for accurate mapping to the clinical assessment. The surface of the sample is generally not very large, so it is generally difficult to manually fit a large number of measurement locations that optimally cover the complete tissue surface.

Ambient light can easily contaminate the Raman signal measurement. This requires the Raman spectra measurements to be performed in the dark. This requires turning ambient lights on/off between each acquisition. Ensuring stability of holding of a measurement probe (no movements) in correct contact with the tissue while altering ambient light level is challenging and prone to error.

SUMMARY

In accordance with examples of the present disclosure, a system for automated spectroscopy measurements of tissue is disclosed. The system comprises a cartesian robot configured to move along at least three axes; a spectroscopic imaging device having a proximal end and a distal end with a tip, detachably connected to the cartesian robot; a high-resolution 3D imaging system; a spectrometer; and a stage configured to be positioned under a tissue sample, whereby the cartesian robot is configured to move the spectroscopic imaging device to at least one point on the tissue sample defined by intersections of the at least three axes and based upon tissue sample contour data in an image acquired by the 3D imaging system; and whereby the spectroscopic imaging device is configured to acquire spectroscopic imaging data at the at least one point.

Various additional features of the system can include one or more of the following features. The stage can comprise a pressure sensor configured to detect contact of the tip of the spectroscopic imaging device with the tissue sample. The pressure sensor can be configured to provide feedback information to the cartesian robot or to the spectroscopic imaging device, or both, when the pressure sensor detects that the spectroscopic imaging device has made contact with the tissue sample. The feedback information can comprise a trigger for the spectroscopic imaging device to acquire spectroscopic imaging data, or an instruction to the cartesian robot to pause movement, or both. The spectroscopic imaging device can incorporate a Raman spectroscopy probe and the spectroscopic imaging data comprises Raman spectra. The system can further comprise a marking device for marking the tissue sample adjacent to the tip of the spectroscopic imaging device, configured to place a mark on the tissue sample each time spectroscopic imaging data is acquired. The tissue sample can be at least 1 cm square in size. The system can further comprise a computer and associated software designed to interpret the Raman spectra and provide individual histopathological assessments corresponding to the at least two points on the tissue sample. The individual histopathological assessments may include presence or absence of cancerous tissue, including precancerous tissue. If cancerous tissue is found, the system can assist in determining, at least in part, the status, progression, or stage of the cancer. The system can be used in a variety of cancerous types including, but are not limited to, prostate, endometrial, etc. The system can also use more than one sample from which relative measurements are performed by the spectroscopic imaging device to analyze differences between the more than one samples.

The system can include a cleaning tool, which can be software controlled using the computer, another computer or controller, that is configured to clean one or more of: a tip of the spectroscopy probe, the marking device, or the stage. The cleaning tool can include a jig or similar device and a cleaning pad(s) that may be a single use pad. The cleaning tool may be provided to address the issue of residual tissue adhering to the tip of the spectroscopy probe from prior spectroscopy measurements. Residual tissue adhesion to the probe tip can contaminate subsequent spectroscopy measurements since part of the acquired Raman signal may be obtained from the tissue adhered to the probe tip rather than tissue in a fresh sample area.

The system can include a sample holder configured to hold the sampled tissue. The sample holder can be separate or part of the stage. The system can include or use a calibration module that is used for pre-measurement calibration. The calibration module can hold one or more samples for the calibration process.

In accordance with examples of the present disclosure, a method of obtaining automated spectroscopy measurements of tissue is discussed. The method can comprise positioning a tissue sample on a stage of a measurement system comprising: a cartesian robot configured to move along at least three axes; a spectroscopic imaging device having a proximal end and a distal end with a tip, detachably connected to the cartesian robot; a high-resolution 3D camera and spectrometer; and a stage configured to be positioned under the tissue sample, whereby the cartesian robot is configured to move the spectroscopic imaging device to at least two points on the tissue sample defined by intersections of the at least three axes and based upon tissue sample contour data in an image acquired by the 3D camera; and whereby the spectroscopic imaging device is configured to acquire spectroscopic imaging data at the at least two points, acquiring an image of the tissue sample with the 3D camera; providing the 3D camera image to the cartesian robot; causing the cartesian robot to move the spectroscopic imaging device to the at least two points on the tissue sample defined by intersections of the at least three axes and based upon the tissue sample contour data in the 3D camera image; and causing the spectroscopic imaging device to acquire spectroscopic imaging data at one or more points.

Various additional features of the method can include one or more the following features. The 3D camera image can be analyzed to identify the optimal number of points for acquisition of spectroscopic imaging data that will provide optimal coverage of spectroscopy data for the tissue sample. The 3D camera can be moved in the vertical (z-axis) direction, such that the 3D camera image can be used to determine an approximate vertical profile to aid in the z-direction movement of the probe.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures:

FIG. 6A shows the calibration jig assembly with a cover, FIG. 6B shows the calibration jig assembly without a cover, and FIG. 6C shows an exploded view of the calibration jig assembly.

FIG. 7A shows an assembled view of the rail system and FIG. 7B shows an exploded view of the rail system.

FIG. 8A shows an assembled view of the tissue sample holder platform 800 and FIG. 8B shows an exploded view of the tissue sample holder platform 800.

DETAILED DESCRIPTION

Generally speaking, examples of the present disclosure provide for a device that automates and simplifies the workflow of measuring Raman signal on or near the surface of freshly excised ex vivo tissue specimen. The device is a 3-axis cartesian robot allowing movement of a Raman Probe relative to the robot coordinate system guided by the image captured with a high resolution 3d camera. The camera captures a high definition image of the tissue sample. The resulting high definition image is used to automatically identify the contours of the specimen that is necessary to maximize number of measurement locations on the specimen surface for maximal coverage of Raman Signal measurements. The device then sequentially moves the tip of the probe to each of automatically determined locations (x,y), makes contact with the surface of the tissue sample at each location, and acquires Raman Spectra. A force sensor located underneath the sample detects when the tip of the probe is in contact with the tissue specimen to control the vertical movement and make the surface measurements, thus, allowing specimen with varying or non-uniform thickness to be sampled automatically and measured. The resulting specimen surface contour definition with marked Raman Spectra measurement locations allows the generation of a mask of the specimen with measurement sites that can be used to overlay on a microscope slide image to obtain histology-based ground truth of the tissue characteristics, which can be used to map to the clinical/histopathological assessment of the tissue at each such location. Knowing the locations of the measurement sites, it is also possible for the robot to automatically mark the exact location of each measurement site directly on the specimen surface with a tissue inking pen.

The disclosed systems and methods address the various deficiencies of the conventional techniques in a number of ways including the following. The 3-axis cartesian robot is fast enough to perform 100 measurements in about 10 minutes. Identification of measurement locations either on the high-definition image of the sample, schematic of the sample with measurement location, or directly on the sample using India ink dots allows for a systematic and precise mapping to the clinical assessment. Computer optimization of the measurement locations allows maximal coverage of the tissue measurement. The complete scanning system can be in a light-tight environment, making ambient light contamination of Raman Signal measurement not a concern.

Figure 1A:
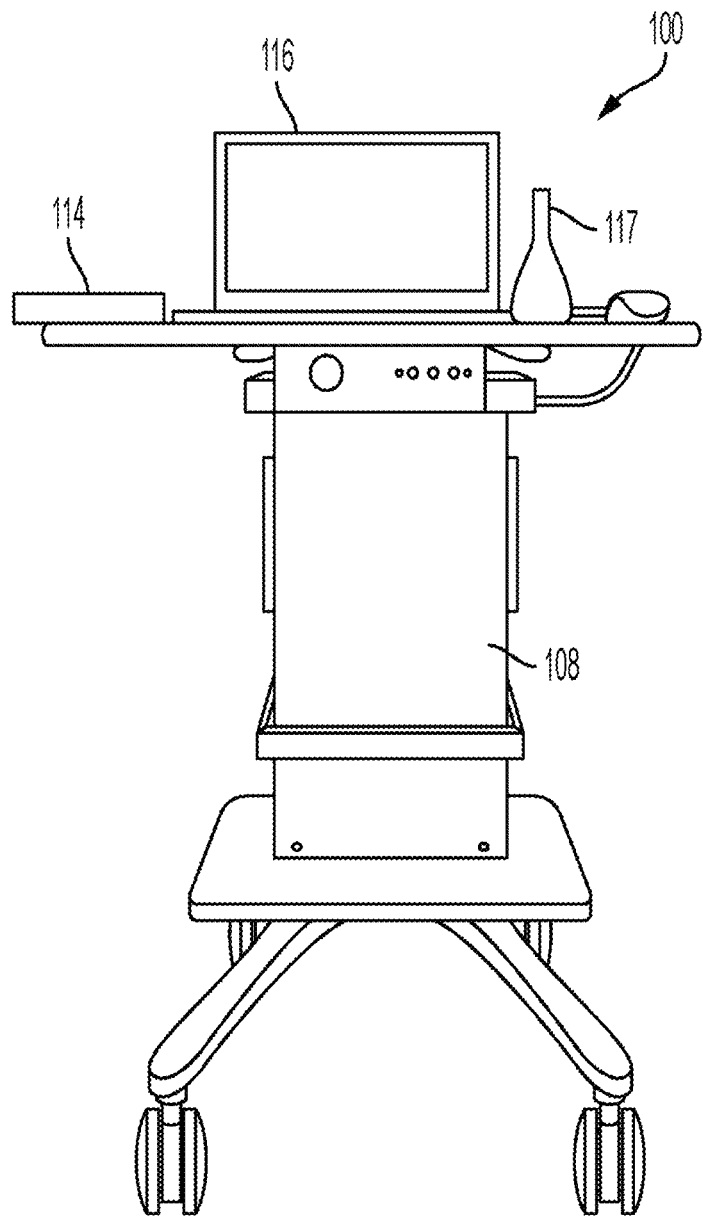
FIG. 1A and FIG. 1B show a front view and detailed internal view of a scanner, respectively, of a system for automated spectroscopy measurements of tissue according to examples of the present disclosure.
Figure 1B:
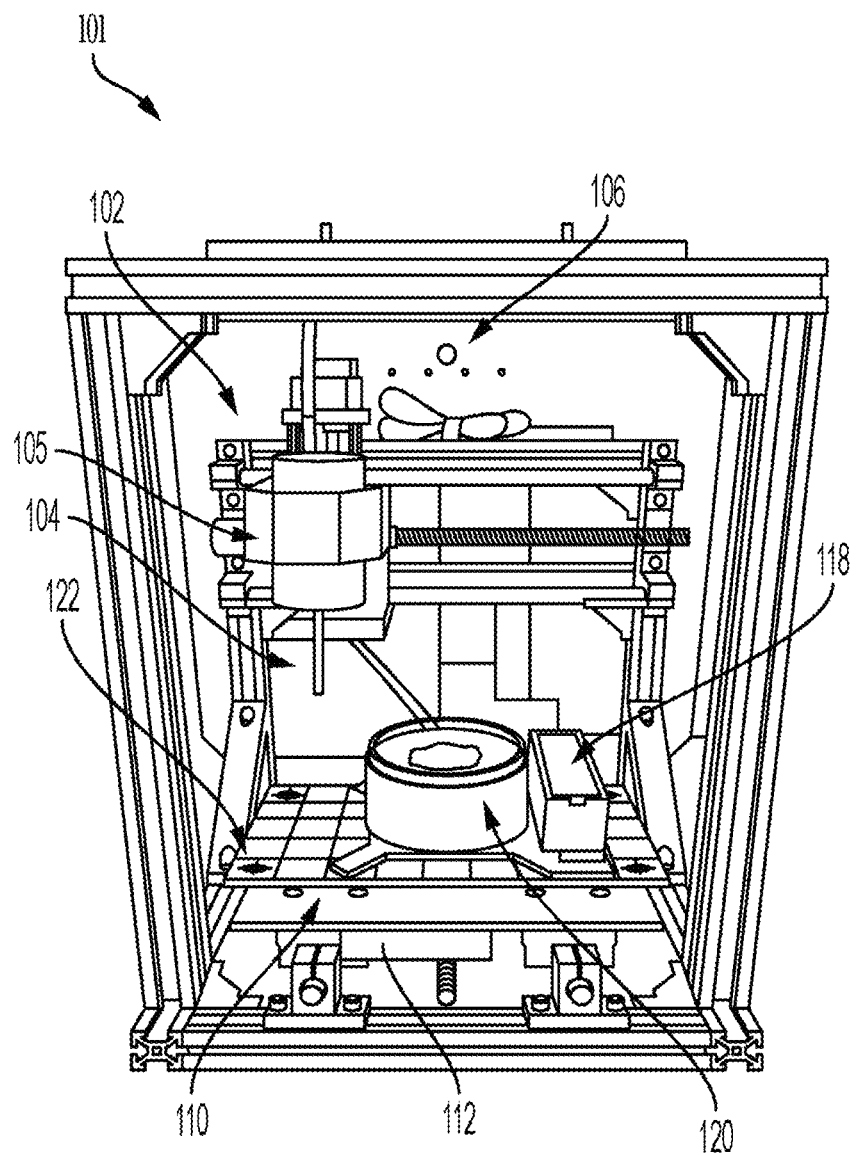

FIG. 1A and FIG. 1B show a front view and detailed internal view of a scanner, respectively, of a system 100 for automated spectroscopy measurements of tissue according to examples of the present disclosure. System 100 comprises a cartesian robot 102 configured to move along at least three axes. System 100 further comprises a spectroscopic imaging device or probe 104 having a proximal end and a distal end with a tip, detachably connected to cartesian robot 102 through motorized probe holder 105. System 100 also comprises a high-resolution 3D imaging system 106, i.e., camera and LEDs for sample visualization, a spectrometer 108, and a stage, i.e., a motorized stage, 110 that is configured to be positioned under a tissue sample. The tissue sample can vary in size depending on the type of treatment being perform. In some examples, the tissue sample can be at least 1 cm square in size.

In some examples, stage 110 comprises a pressure sensor 112 that is configured to detect contact of the tip of spectroscopic imaging device 104 with the tissue sample. Pressure sensor 112 can be configured to provide feedback information to cartesian robot 102 or to spectroscopic imaging device 104, or both, when pressure sensor 112 detects that spectroscopic imaging device 104 has made contact with the tissue sample. The feedback information can comprise a trigger for spectroscopic imaging device 104 to acquire spectroscopic imaging data, or an instruction to cartesian robot 102 to pause movement, or both. Pressure sensor 112 or a force sensing system placed underneath the sample allows automatic detection of probe contact with the sample and stops the probe descending further. This allows for measuring samples with an arbitrary thickness and surface aspect (not necessarily flat).

Cartesian robot 102 is configured to move spectroscopic imaging device 104 to at least one point on the tissue sample defined by intersections of the at least three axes and based upon tissue sample contour data in an image acquired by 3D imaging system, i.e., camera and LEDs for sample visualization, 106. In one non-limiting example, a stage system beneath the sample (scanner bed) can move left and right (the x-direction). The spectroscopic measurement device can move front and back (the y-direction) and up and down (the z-direction). The movement of the spectroscopic device in the three directions is independent, where the z-direction movement is controlled by the z-direction of the imaging system with a pressure sensor feedback from a load cell and the x-y direction is controlled by the measuring system identifying the measurement locations via 3D image processing to identify the outer and inner contours in the x-y view of the high resolution imaging system.

Spectroscopic imaging device 104 is configured to acquire spectroscopic imaging data at the one or more points. In some examples, spectroscopic imaging device 104 can incorporate a Raman spectroscopy probe and the spectroscopic imaging data comprises Raman spectra. The Raman spectroscopy probe may take the embodiment of the probe described in WO2019/142136, the disclosure of which is hereby incorporated herein in its entirety.

In some examples, the probe of the spectroscopic imaging device 104 is attached to 3-axis cartesian robot 102 using a probe holder mounted on a spring or rail system, which limits the force applied to the tip of the probe when it hits a hard surface and provides protection against damage to the probe tip as well as protection against damaging the tissue being measured. This not only protects the optics at the tip of the probe from breaking under the pressure of the mechanical force when it encounters a hard surface, but also allows to measure solid samples such as Tylenol pills or NIST standard.

In some examples, system 100 can further comprise a marking device 114 for marking the tissue sample adjacent to the tip of spectroscopic imaging device 104. Marking device 114 can be configured to place a mark on the tissue sample each time spectroscopic imaging data is acquired. For example, marking device 114 can be an India ink pen, or suitably similar device, attached along with the Raman probe to mark the tissue sample location with a dot of black ink.

In some examples, system 100 can further comprise a computer 116 and associated software designed to capture the Raman spectra corresponding to the one or more points on the tissue sample and a barcode scanner 117 that can be used to scan barcodes associated with various components of the system or specimens. The individual histopathological assessments may include presence or absence of cancerous tissue, including precancerous tissue. If cancerous tissue is found, system 100 can assist in determining, at least in part, the status, progression, or stage of the cancer. System 100 can be used in a variety of cancerous types including, but are not limited to, prostate, endometrial, etc. System 100 can also use more than one sample from which relative measurements are performed by spectroscopic imaging device 104 to analyze differences between the more than one samples.

Figure 3A:
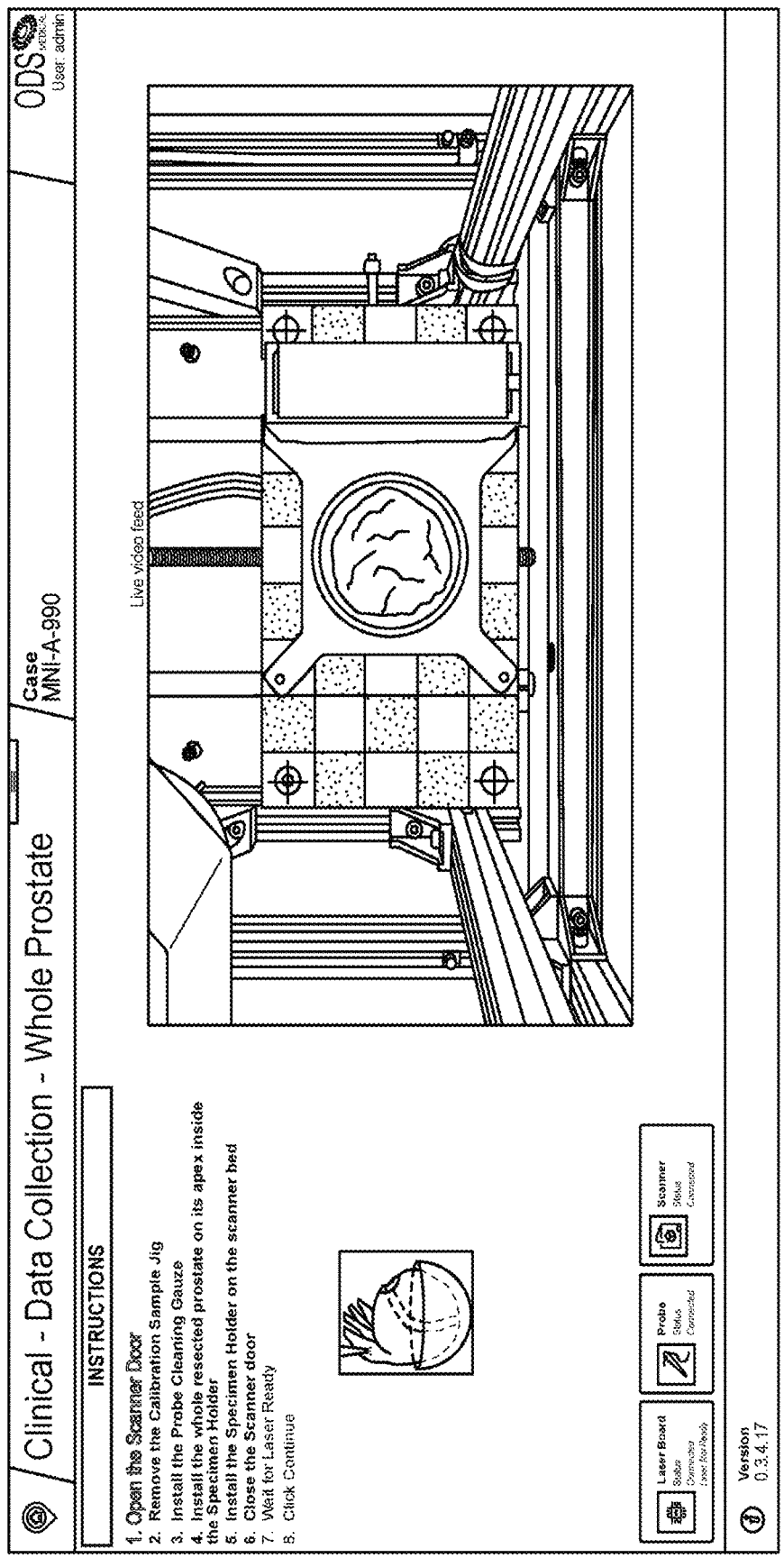
FIG. 3A and FIG. 3B show a top view and perspective side view, respectively, of the system performing a whole tissue specimen measurement procedure, according to examples of the present disclosure.
Figure 3B:
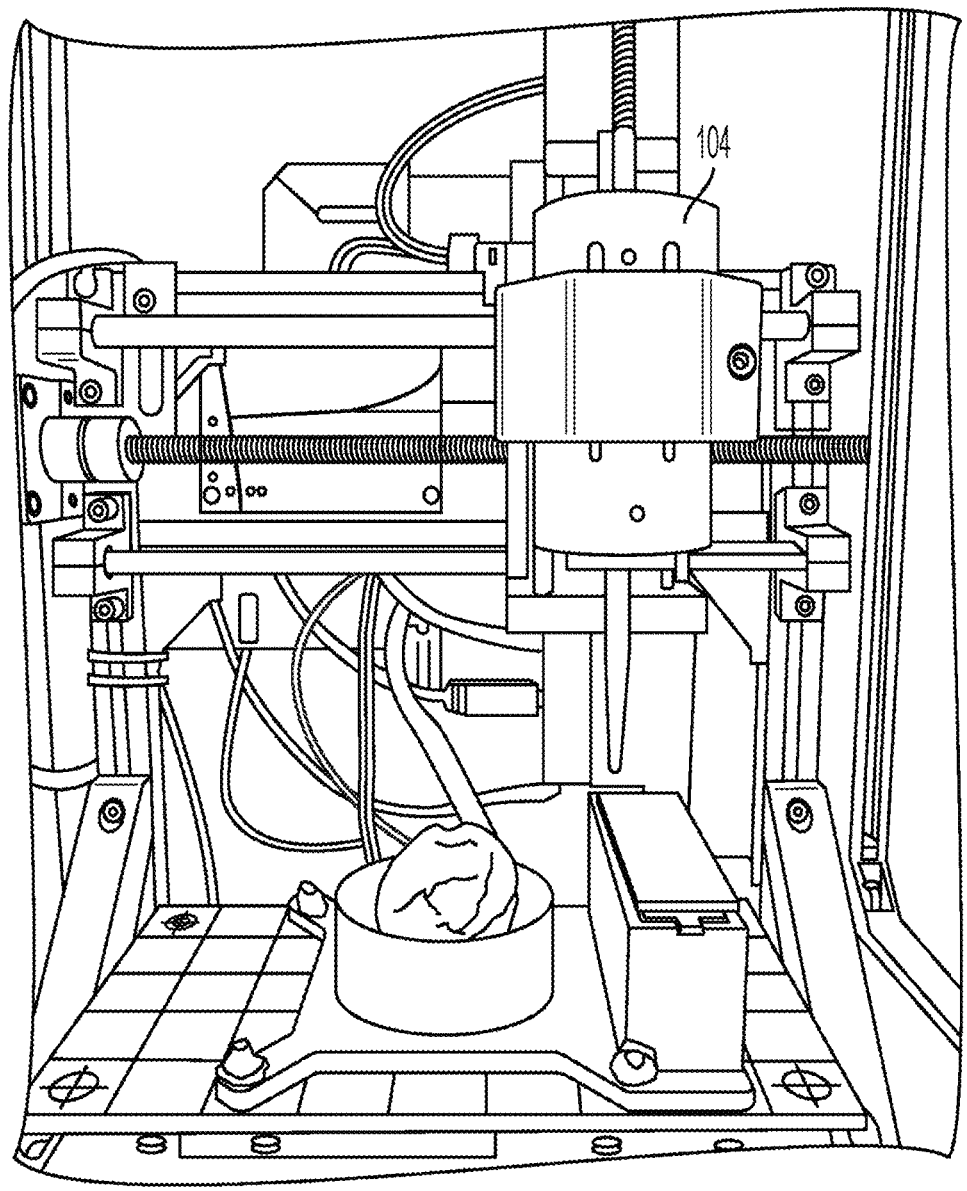

Computer 116 can be configured to perform adaptive segmentation and noise removal. An advanced image guided scanning operation based on sample perimeter, contours and meshes play a critical role in the scanner applications. The scanning operation allows automatically generated sampling locations to be used to acquire Raman spectra uniformly on the tissue surface with optimal surface coverage. As shown in FIGS. 3A and 3B, the detection of contours (outline and interior contours) is critical to the usage of the scanner. Uniform locations (termed as Sampling Points) on the contours are identified for data collection. The locations cover the complete tissue thereby providing a complete coverage. A false detection in contours introduces erroneous sample points (x, y coordinates). Additionally, the detection of sample holder, four corner crosshair markers, and removal of checkered pattern provide an accurate mapping and translation between image plane and machine co-ordinate system. The cartesian image x, y coordinates will map to scanner's co-ordinate system for probe movement. Calibrated marker detection and contour detection helps in making this process accurate.

Computer 116 can be configured to perform depth imaging. Shadows due to lighting can cause false contour detection. Depth imaging in addition to the 2D RGB images allow such false contours to be eliminated resulting in a high-fidelity outer contour of the issue specimen. Outer contour detection provides for subsequent inner concentric contours to be detected, which results in the identification of measurement sites. By using depth images in addition to 2-D RGB images, it is possible to significantly reduce noise during the segmentation procedure. Depth image processing allows better Image background removal which plays an important role in improved contour identification and. The depth image of the surface of the tissue specimen (image of distance to the tissue surface) is an approach that will allow finer control of the probe in the vertical direction thus alleviating the need for a mechanical sensing system with the force sensor.

3D imaging and depth maps have not been used previously for scanner applications in Raman spectroscopy. By leveraging the depth map information, a 3D reconstruction of the tissue can be produced that will help in image registration. This can be achieved in a two-step process in moving the probe in the vertical direction. First, an estimate of a z-location can be assessed with the depth imaging allowing the probe to move rapidly to a known location. Subsequently, finer movement of the probe can be made using the pressure sensing system. This provides for numerous advantages including faster movement to the desire tissue surface at the x, y-location, soft landing of the probe tip on the tissue surface such that it does not damage the tissue, and protection of the probe from being damage on a hard surface.

In some examples, system 100 can further comprise a cleaning tool 118, which can be software controlled using computer 116, another computer or controller, that is configured to clean one or more of: a tip of the spectroscopy probe, marking device 114, or stage 110. Cleaning tool 118 can include a jig or similar device and a cleaning pad(s) that can be single use pad.

In some examples, system 100 can further comprise a sample holder 120 that is configured to hold the sampled tissue. Sample holder 120 can be separate or part of stage 110.

Figure 2A:
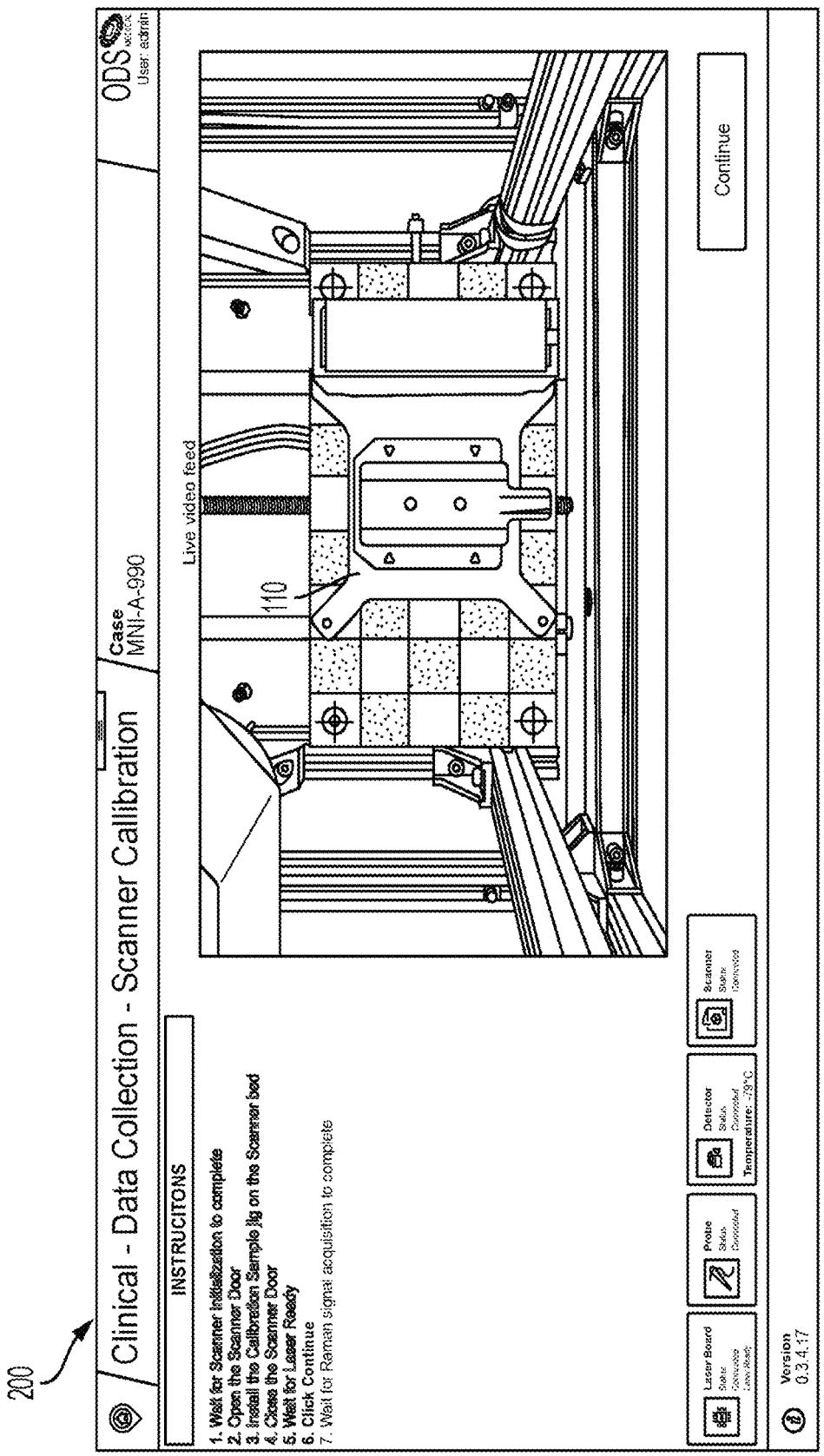
FIG. 2A and FIG. 2B show a top view and a detailed view of the scanner of FIGS. 1A and 1B, respectively, during a calibration process, according to examples of the present disclosure.
Figure 2B:
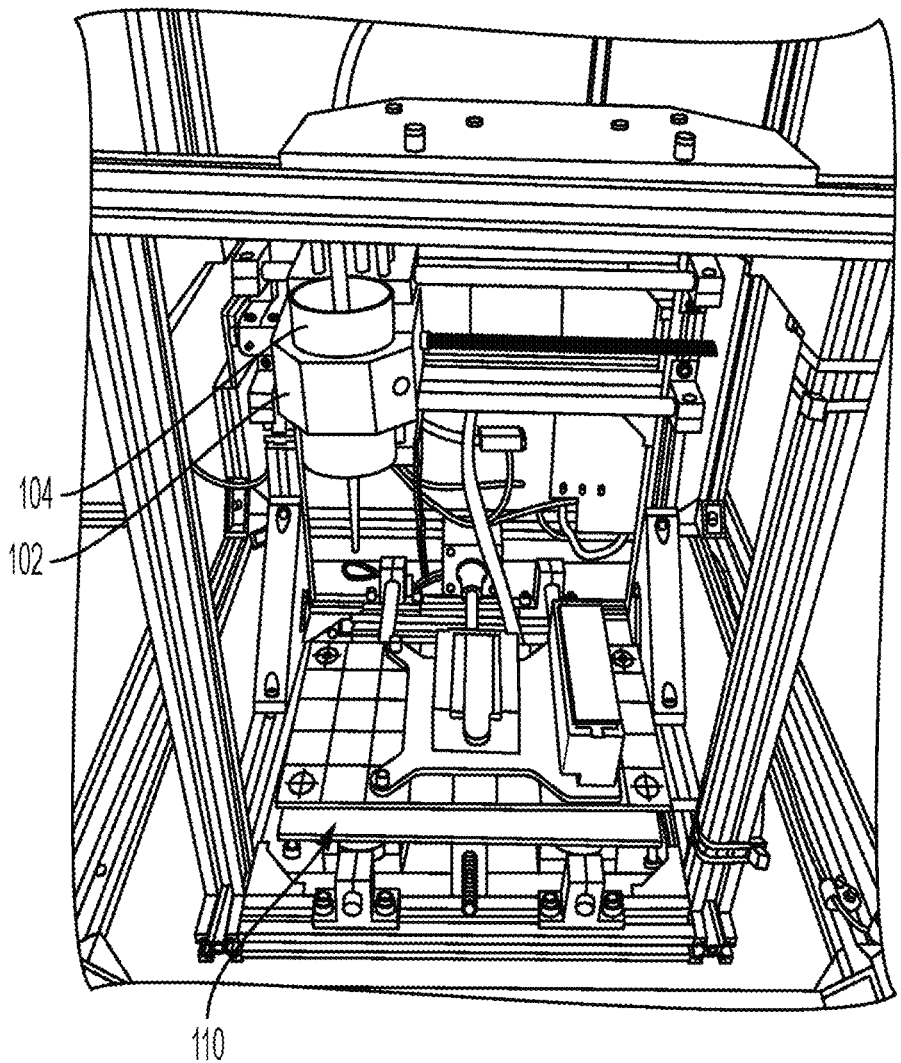

FIG. 2A and FIG. 2B show another view of system 100 according to examples of the present disclosure. The examples of FIGS. 2A and 2B are similar to FIG. 1B, but shown during calibration phase of operation.

FIG. 3A and FIG. 3B show another view of system 100 according to examples of the present disclosure. The examples of FIGS. 3A and 3B are similar to FIGS. 2A and 2B, but shown during whole tissue specimen measurement process.

Figure 4A:
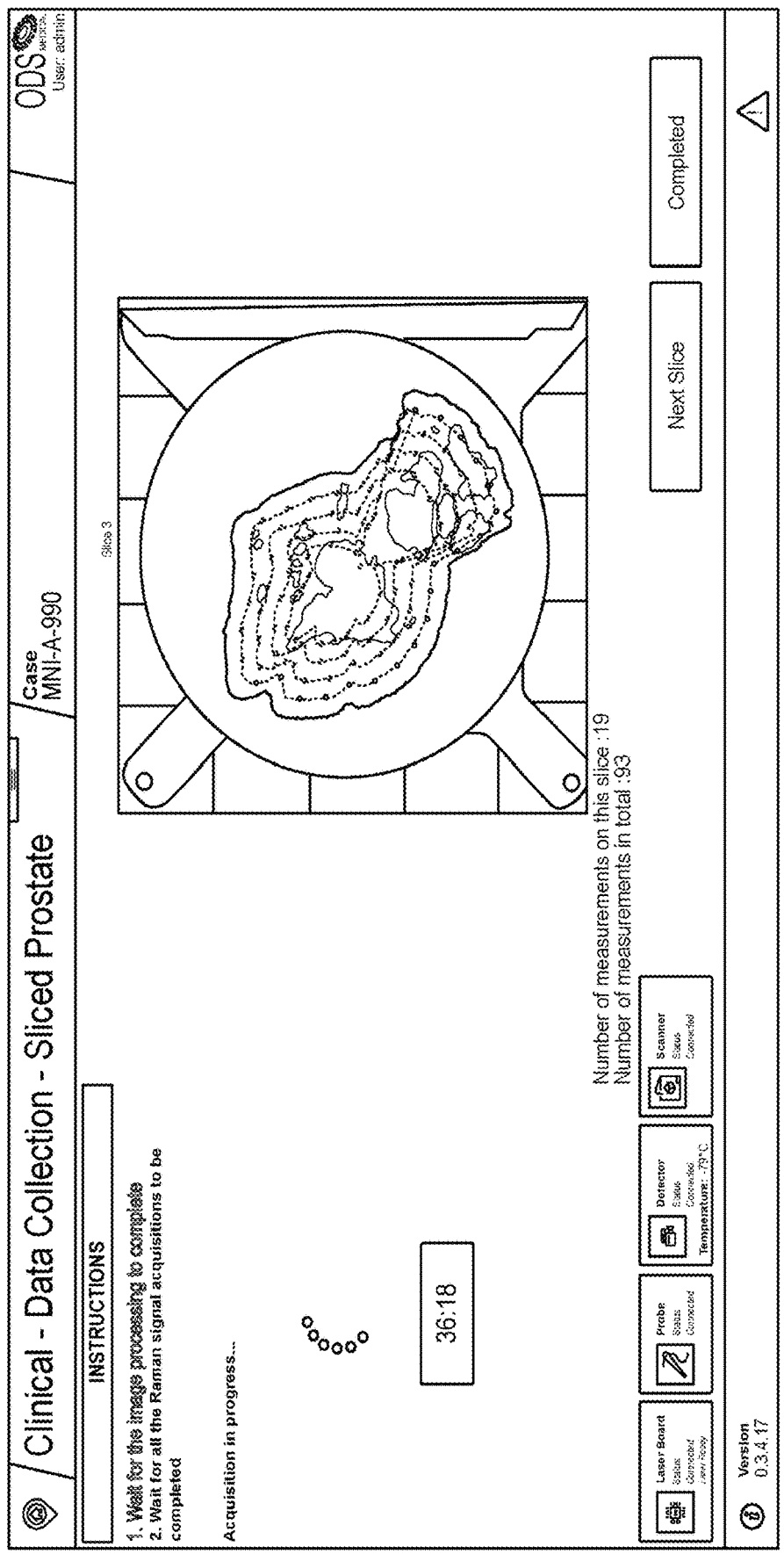
FIG. 4A and FIG. 4B show a top view and perspective side view, respectively, of the system performing a sliced tissue specimen measurement procedure, according to examples of the present disclosure.
Figure 4B:
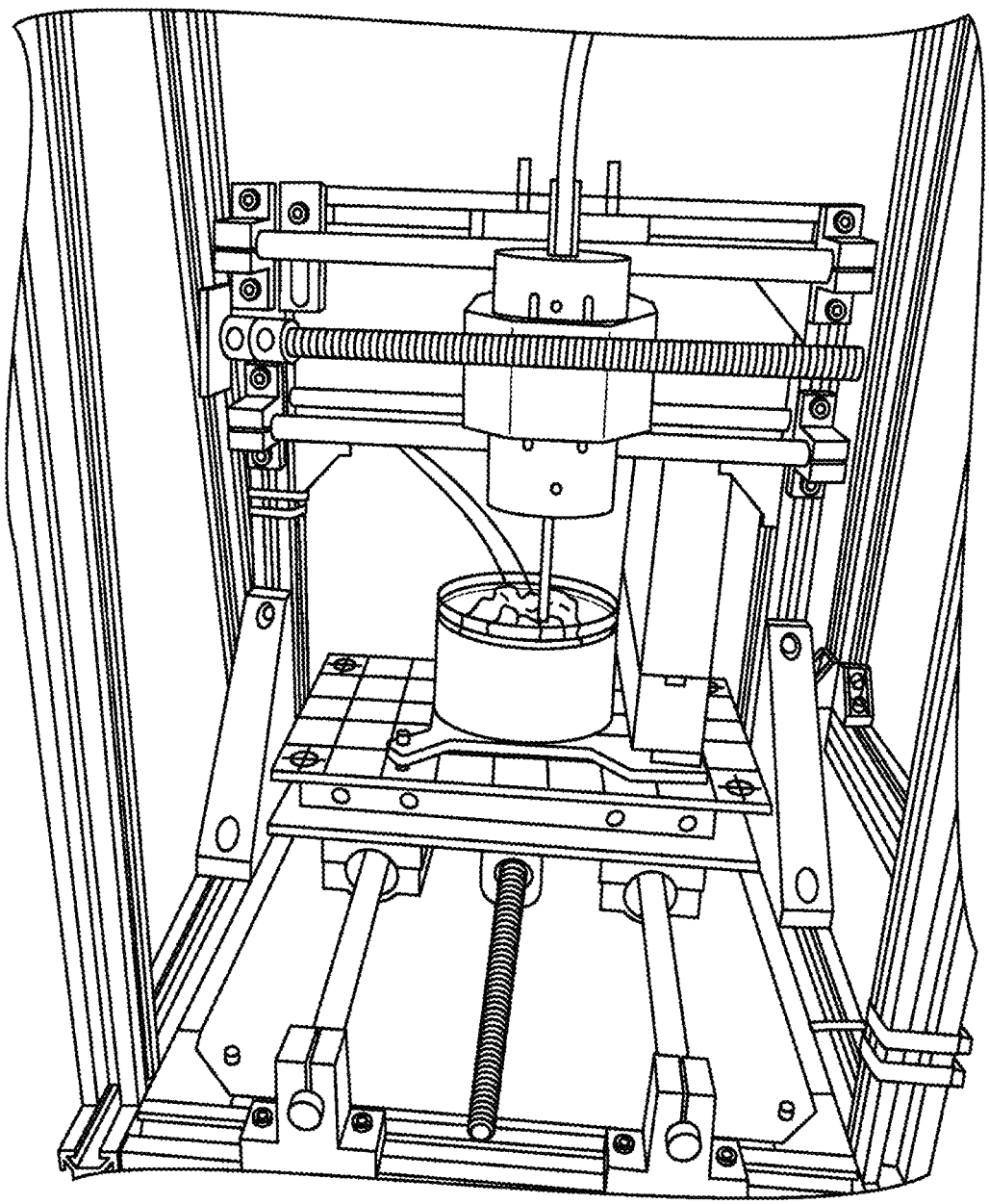

FIG. 4A and FIG. 4B show a top view and perspective side view, respectively, of system 100 performing a sliced tissue specimen segmentation procedure, according to examples of the present disclosure.

Figure 5:
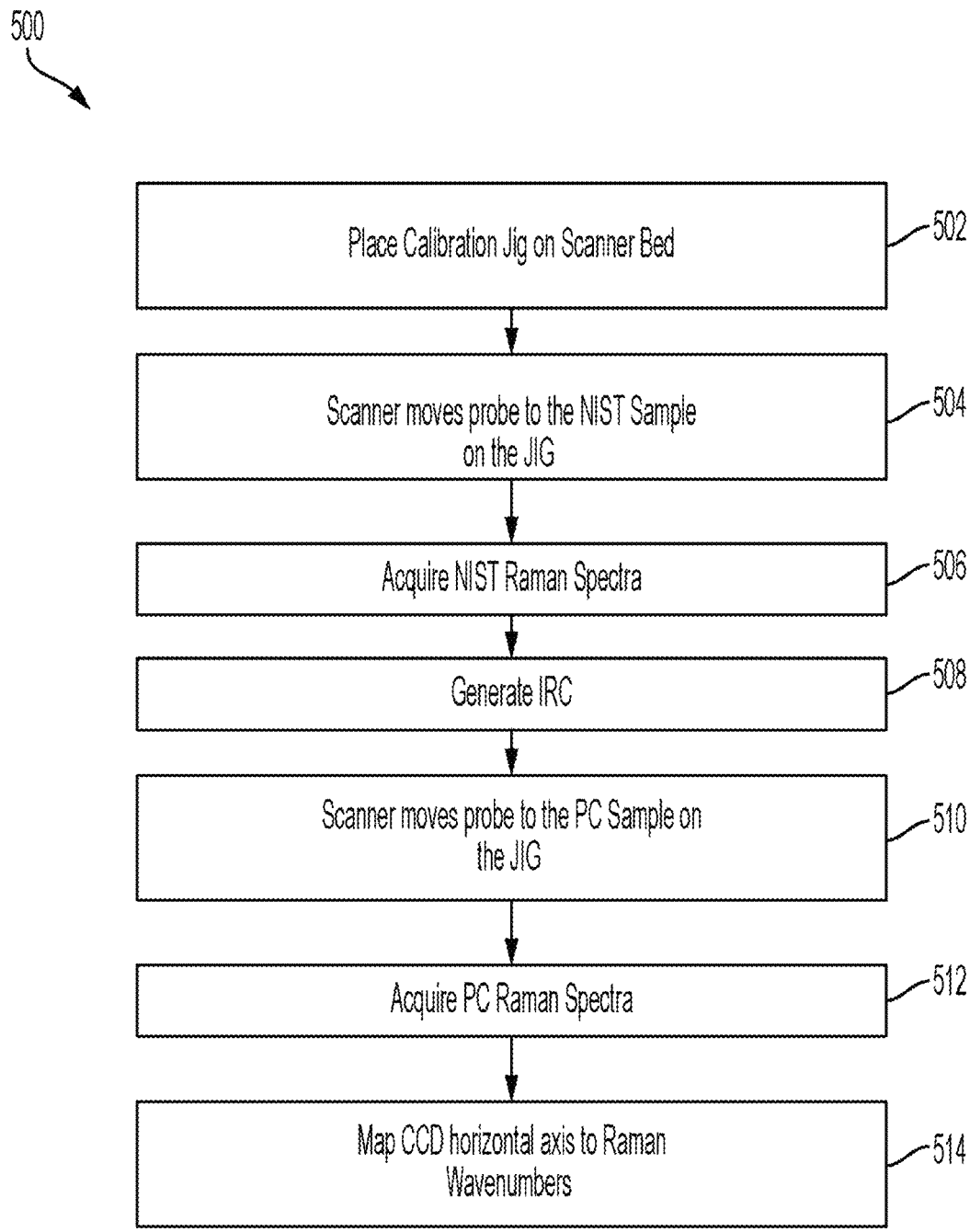
FIG. 5 shows a data calibration method according to examples of the present disclosure.

In some examples, system 100 can further comprise a calibration module 122, i.e., the checkerboard pattern on which the sample holder 120 is arranged, that is used for pre-measurement calibration. Calibration module 122 can hold one or more samples for the calibration process. Prior to starting any measurements on the tissue specimen, the system is calibrated. FIG. 5 shows a calibration method 500, according to examples of the present disclosure. The calibration uses a NIST standard to calibrate the system response, such as the system optics, that may change due to environmental conditions, such as heat, humidity, etc. The calibration can be done by taking measurements on two calibration samples comprising materials with known Raman spectra. The calibration method 500 begins by placing a calibration jib on the scanner bed, as in 502. In some examples, the two calibration samples can be included on the calibration jig. The calibration jig can be placed on the scanner bed using a magnetic placement attachment. The calibration method 500 continues by moving the probe by the scanner to the NIST sample on the jig, as in 504. The method 500 continues by acquiring the NIST Raman spectra, as in 506. The measurement of NIST Raman is compared against the known Raman spectra of the NIST sample. The method 500 continues by generating an instrument response curve (IRC or ratio of measured/known) that is used to correct the measured tissue Raman for system specific changes, as in 508. The method 500 continues by moving the probe by the scanner to the polycarbonate (PC) sample on the jig, as in 510. The method 500 continues by acquiring the PC Raman spectra, as in 512. The method 500 continues by mapping the CCD horizontal axis to Raman wavenumbers, as in 514. Measurements based on the PC Raman spectra are used to map or calibrate the x-axis, which maps the pixels on the horizontal axis of the CCD to Raman wavenumber shifts. The peaky Raman spectra of PC at known peaks are used to map the pixels of the CCD in the horizontal axis to the Raman wavenumbers by using an iterative algorithm that can automatically map the known Raman peaks of PC to the measured peaks and thereby generate the x-axis of Raman measurements for the tissue specimen Raman spectra.

Figure 6A:
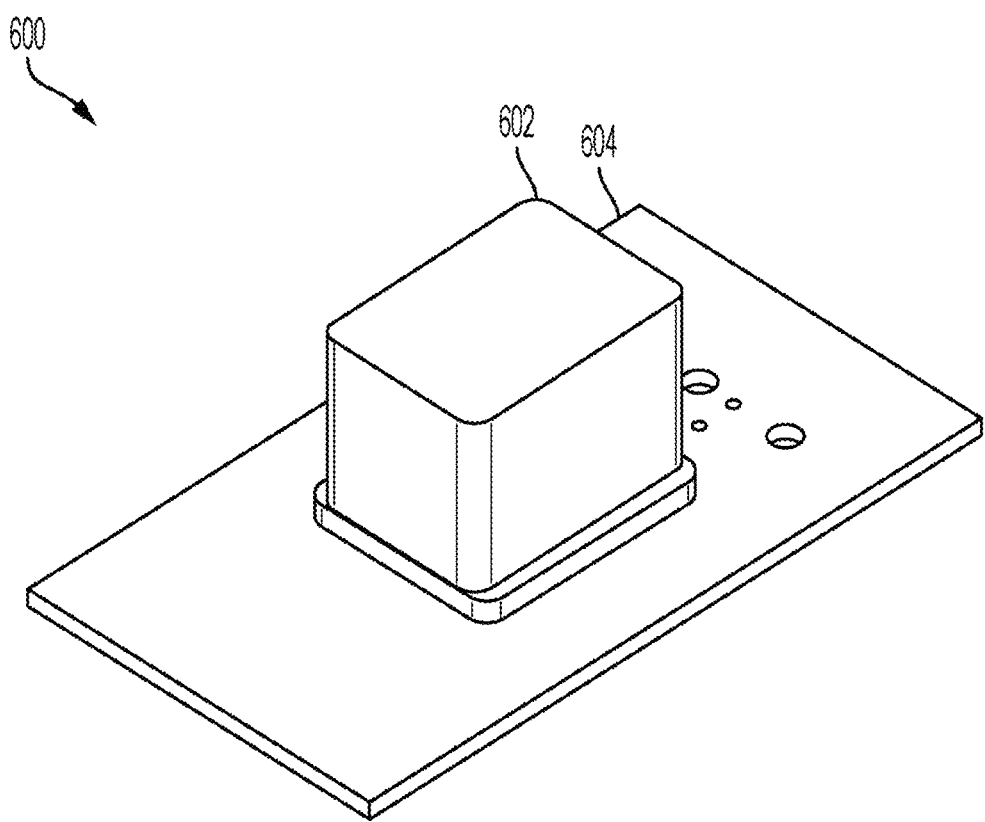
FIG. 6A, FIG. 6B, and FIG. 6C show a calibration jig assembly, according to examples of the present disclosure. In particular.
Figure 6B:
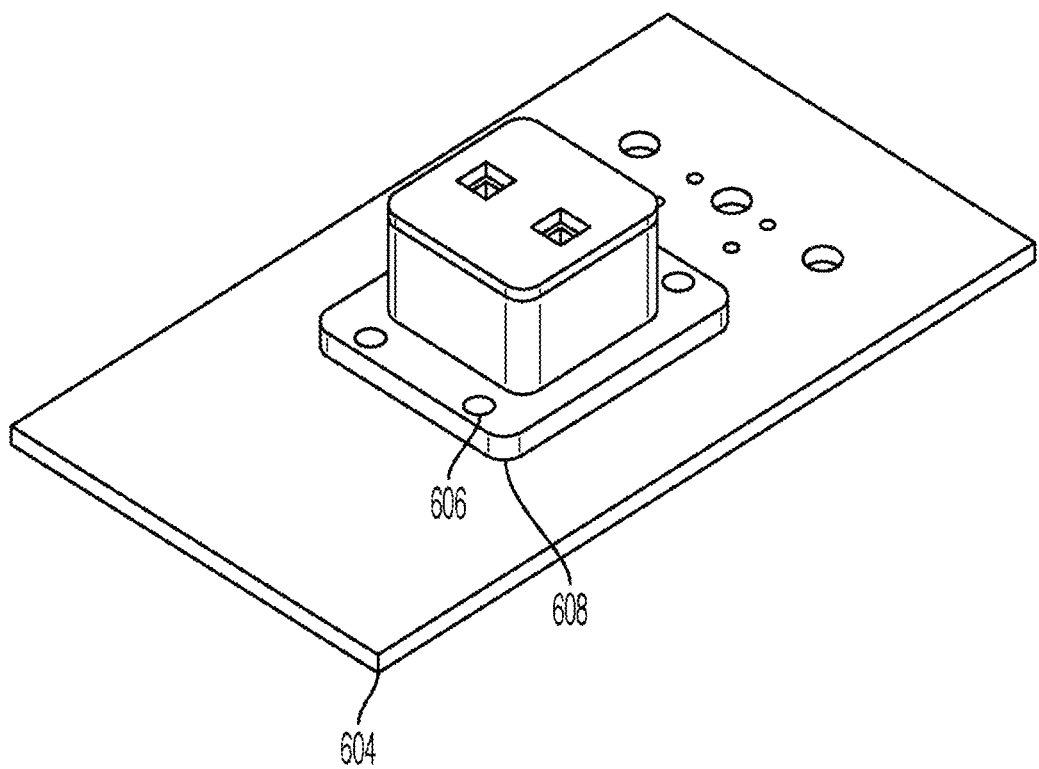
Figure 6C:
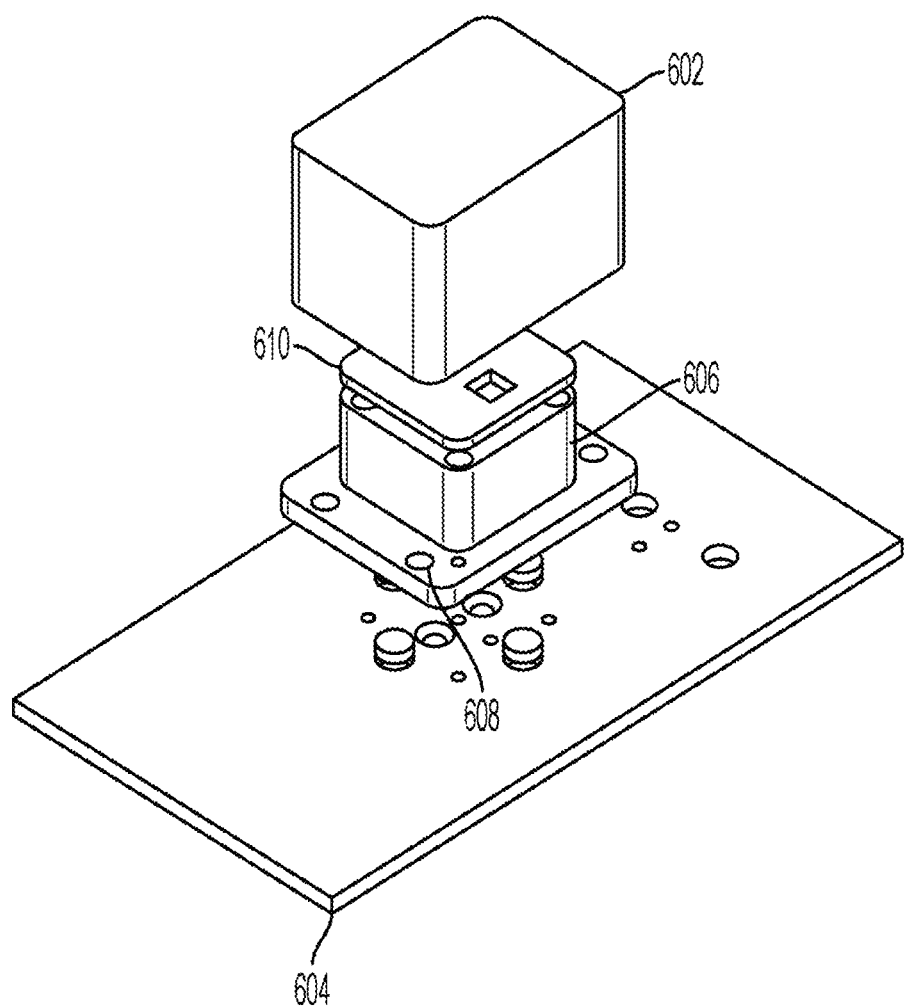

FIG. 6A, FIG. 6B, and FIG. 6C show a calibration jig assembly 600, according to examples of the present disclosure. In particular, FIG. 6A shows the calibration jig assembly 600 with a cover, FIG. 6B shows the calibration jig assembly 600 without a cover, and FIG. 6C shows an exploded view of the calibration jig assembly 600. FIG. 6A shows an arrangement of a cover 602 in relation to a base plate 604. The cover 602 provides protection from dust and other containments. FIG. 6B shows a sample holder 606 mounted on a support 608, which in FIG. 6A are covered by cover 602. Support 608 is mounted on the base plate 604. FIG. 6C shows the arrangement of the various components of the calibration jig assemble 600 including the base plate 604, the sample holder 606, and the support 608. The sample holder 606 can include a sample holder cover 610, which can be a NIST and polycarbonate cover.

Figure 7A:
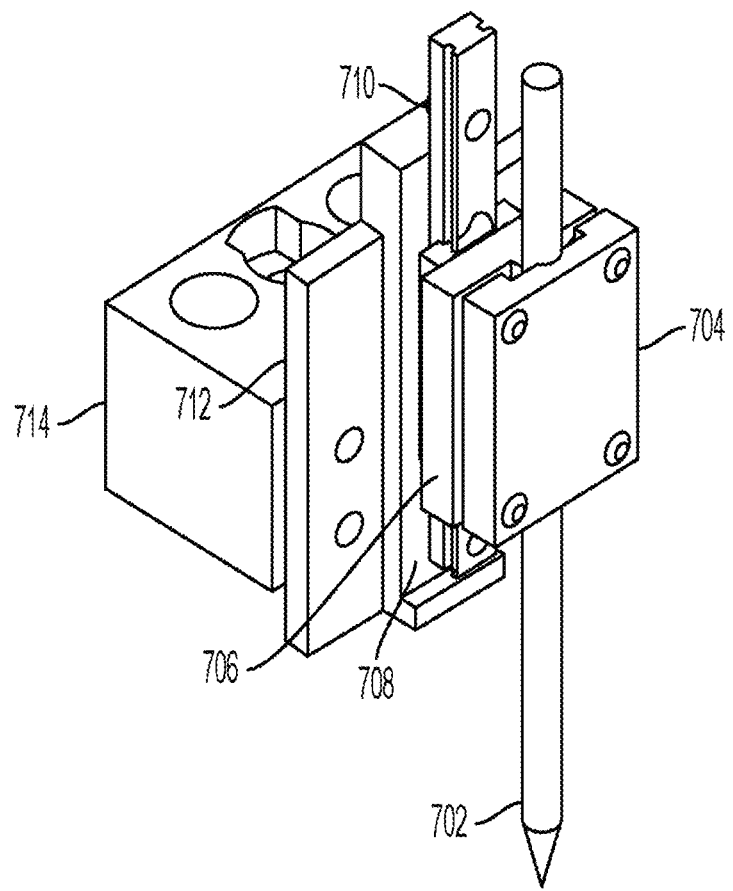
FIG. 7A and FIG. 7B show a rail system that can be used to support and move the probe, according to examples of the present disclosure. In particular.
Figure 7B:
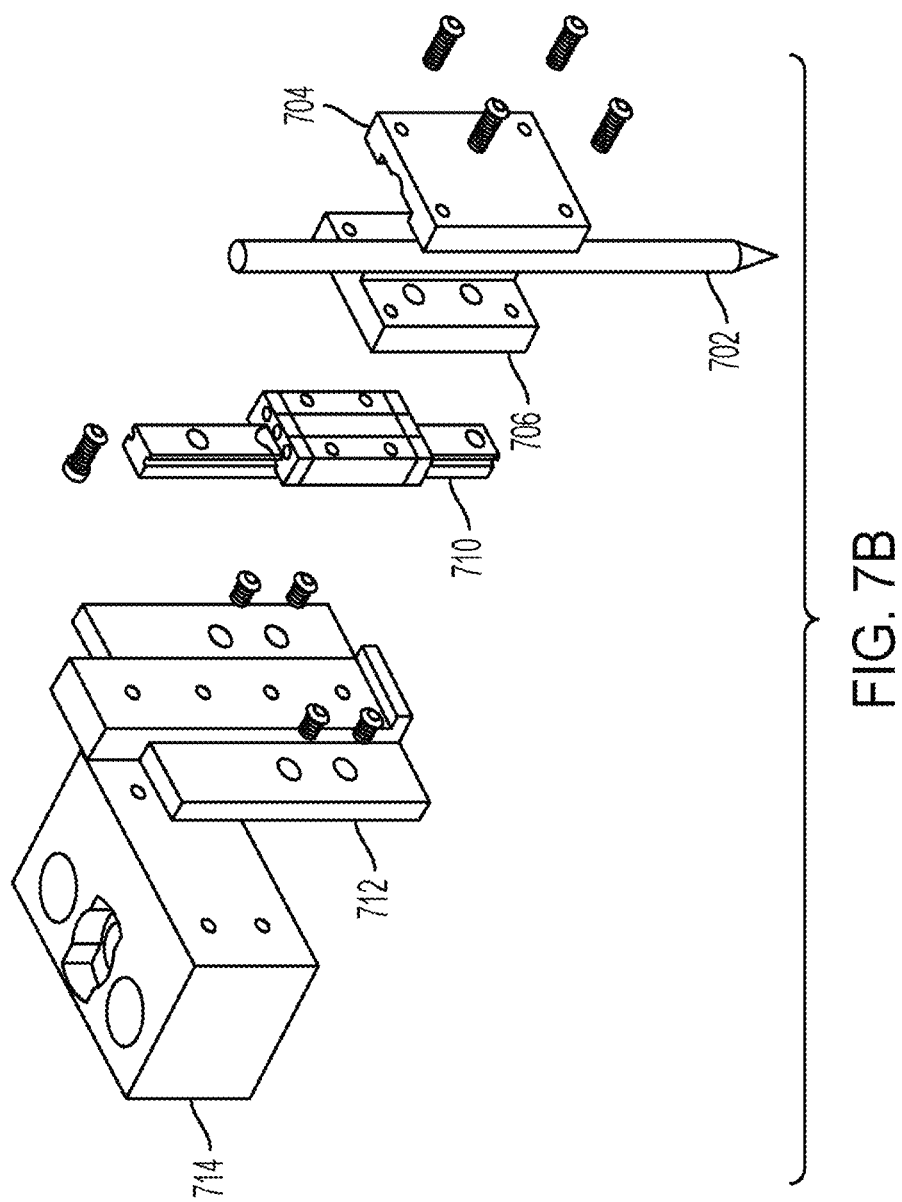

FIG. 7A and FIG. 7B show a rail system 700 that can be used to support and move the probe, according to examples of the present disclosure. In particular, FIG. 7A shows an assembled view of the rail system 700 and FIG. 7B shows an exploded view of the rail system 700. The rail system 700 comprises a probe 702 that is secured between a probe holder sub-assembly first plate 704 and a probe holder sub-assembly second plate 706 of a probe holder sub-assembly 708. The probe holder sub-assembly second plate 706 is mounted on a rail 710. The probe holder sub-assembly 708, and thus the probe 702, can be actuated to move in a up and down direction (z-axis direction) on the rail 710. The rail 710 is mounted to fixture plate 712, which is then mounted on a rear support member 714. The various components can be secured using a variety of attachment members, such as screws, nuts, washers, as known in the art.

Figure 8A:
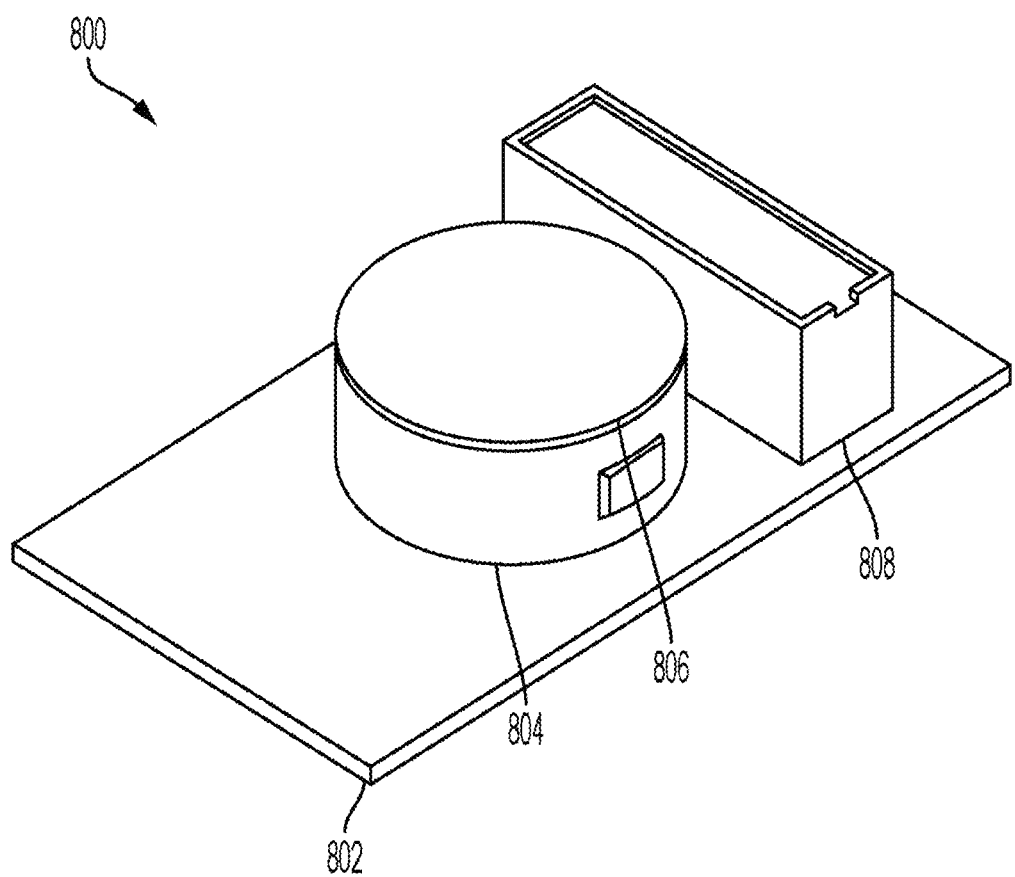
FIG. 8A and FIG. 8B shows a tissue sample holder platform, according to examples of the present disclosure. In particular.
Figure 8B:
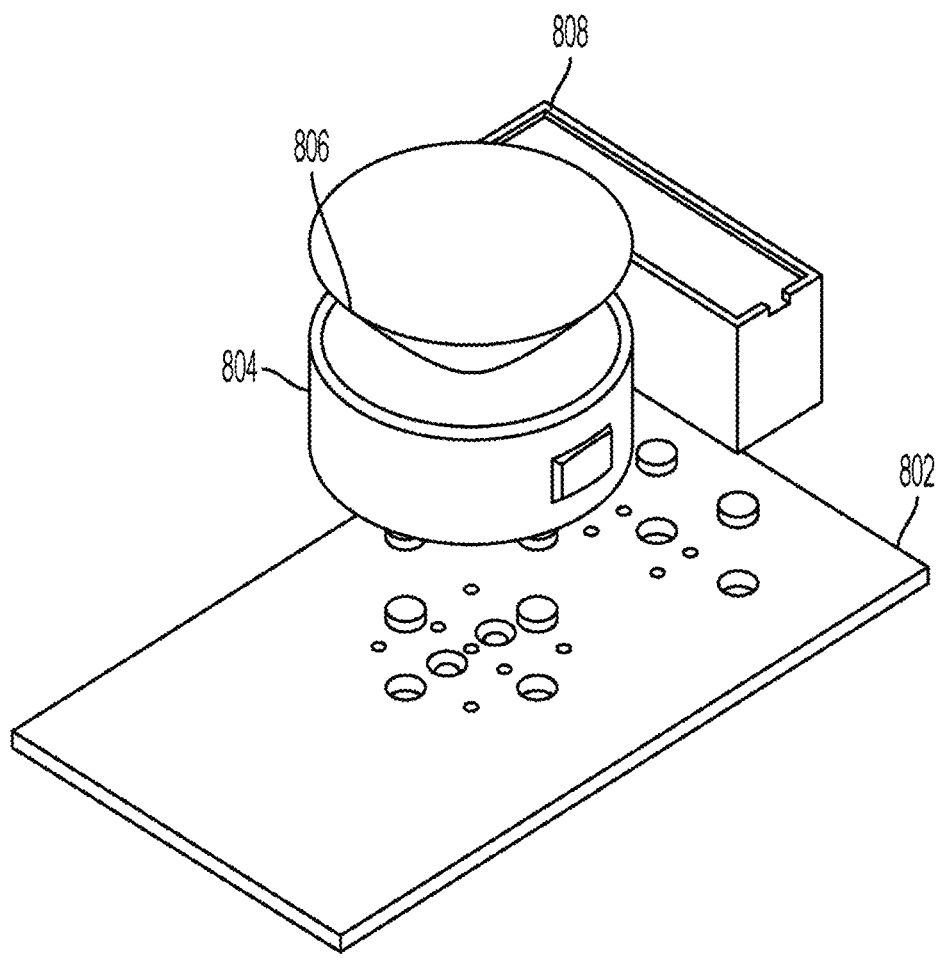

FIG. 8A and FIG. 8B shows a tissue sample holder platform 800, according to examples of the present disclosure. In particular, FIG. 8A shows an assembled view of the tissue sample holder platform 800 and FIG. 8B shows an exploded view of the tissue sample holder platform 800. The A tissue sample holder platform 700 comprises a base plate 802 that supports a tissue sample holder 804, a sample holder cover 806, and a probe cleaning pad 808. The tissue sample holder 804 and the probe cleaning pad 808 can be secured to the base plate 802 using a variety of attachment members, such as screws, nuts, washers, as known in the art.

Figure 8C:
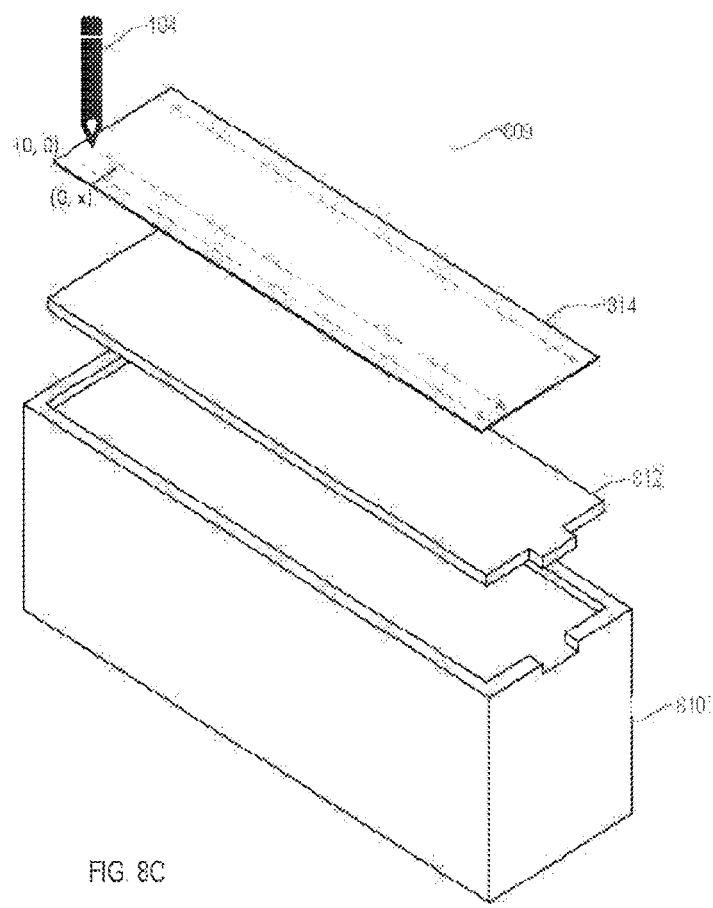
FIG. 8C shows a probe tip cleaning apparatus 809 according to examples of present disclosure.

FIG. 8C shows a probe tip cleaning apparatus according to examples of the present disclosure. In making successive measurement, the tip of the probe 104 comes into contact with a tissue sample and makes Raman spectroscopy measurements, each measurement occurring over a certain measurement time. Once each measurement is complete, the probe 104 is retracted and moves to a new location to make another measurement. Over the course of multiple measurements, the probe tip may acquire sticky residual tissue from the past measurements. Depending on the state of the tissue specimen, this may occur due to the tissue becoming dry due to prolonged open-air exposure, or it may simply be a result of accumulation of residual sticky tissue. This can lead to incorrect Raman measurements acquired from the tissue, as part of the acquired Raman signal may be due to the presence of residual tissue on the probe tip from previous measurement(s). One way to avoid such a situation would be to clean the probe tip between each measurement.

Since the operation of the system 100 is to make multiple measurements rapidly and automatically, it is necessary to develop an automated probe tip cleaning solution in between two successive Raman measurements. To address this, a probe tip cleaning apparatus 809 is shown in FIG. 8C. It consists of rectangular probe cleaning jig 810 that is mounted on a stage, optionally the motorized stage 110. The jig 810 locks into a prespecified location on the stage 110 with the aid of magnets that are mounted on the bottom of the jig 810. The jig also includes two disposable components: a polycarbonate substrate 812 and a cleaning pad 814. The polycarbonate substrate 812 has a handle on one edge to lift it from the jig 810. The polycarbonate substrate 812 is used to hold the cleaning pad 814 that is used to clean the tip of the probe 104. The cleaning pad 814 is held in place on the substrate 812 by a two-sided glue strip on the top short side. The cleaning pad 814 is further held in place by wetting it with a few drops of distilled water. The distilled water on the substrate creates a natural adhesion eliminating any movement.

The cleaning pad 814 may comprise any material known to one of skill in the art to be suitable for the purpose of cleaning the tip of the probe 104. In short, the chosen material should be capable of being removably affixed to the polycarbonate substrate 812, it should be capable of removing biological materials from the tip of the probe 104, but should not cause any damage to the tip of the probe 104. Solely by way of example, the present inventors have found Contec™ Amplitude™ EcoCloth™ Cleanroom Wipes from Fisher Scientific to be suitable for this purpose, but one of skill in the art will realize that suitable alternatives exist.

Using the cleaning apparatus 809 in FIG. 8C a method of taking automated Raman measurements including cleaning the tip of the probe 104 between measurements is provided. The operation of the system 100 includes guiding the tip of the probe 104 to the tissue sample to take a Raman spectroscopy measurement and then guiding the tip of the probe 104 to a location on the cleaning pad 814 before taking the next Raman spectroscopy measurement. Both the Raman spectroscopy measurement step and the cleaning step may be automated and the system may guide the probe tip 104 through N cycles of measurement and cleaning. For cleaning, the tip of the probe 104 is guided to a specified location on the cleaning pad 814, making contact with the cleaning pad 814 then dragging the tip of the probe 104 a certain distance while maintaining contact with the cleaning pad 104. This will allow any residual tissue on the tip of the probe 104 from the previous Raman measurement to be wiped clean. By knowing the geometry of the jig 810, geometry of the probe tip 104 and the length of the drag required to clean the tip of the probe 104, it is possible to clean the probe after each Raman measurement at different areas on the cleaning pad 814 for N measurement cycles. Collection software controls all cleaning parameters. Solely by way of example, the probe starts at top-left, (0,0) point and while maintaining contact with the cleaning pad 814 as it is dragged x mm to (0, x) location to clean the tip of the probe 104. Subsequent cleaning cycle will start at (0,x) and continue in a similar manner to clean after each Raman measurement. Once the tip of the probe 104 has reached the bottom of a first column of cleaning locations, the cleaning continues along a second column and so on. With such a strategy it is possible to make N measurements with a single cleaning pad. After the N cleaning sites on the cleaning pad are exhausted, the substrate 812 and the cleaning pad 814 can be discarded.

Figure 9:
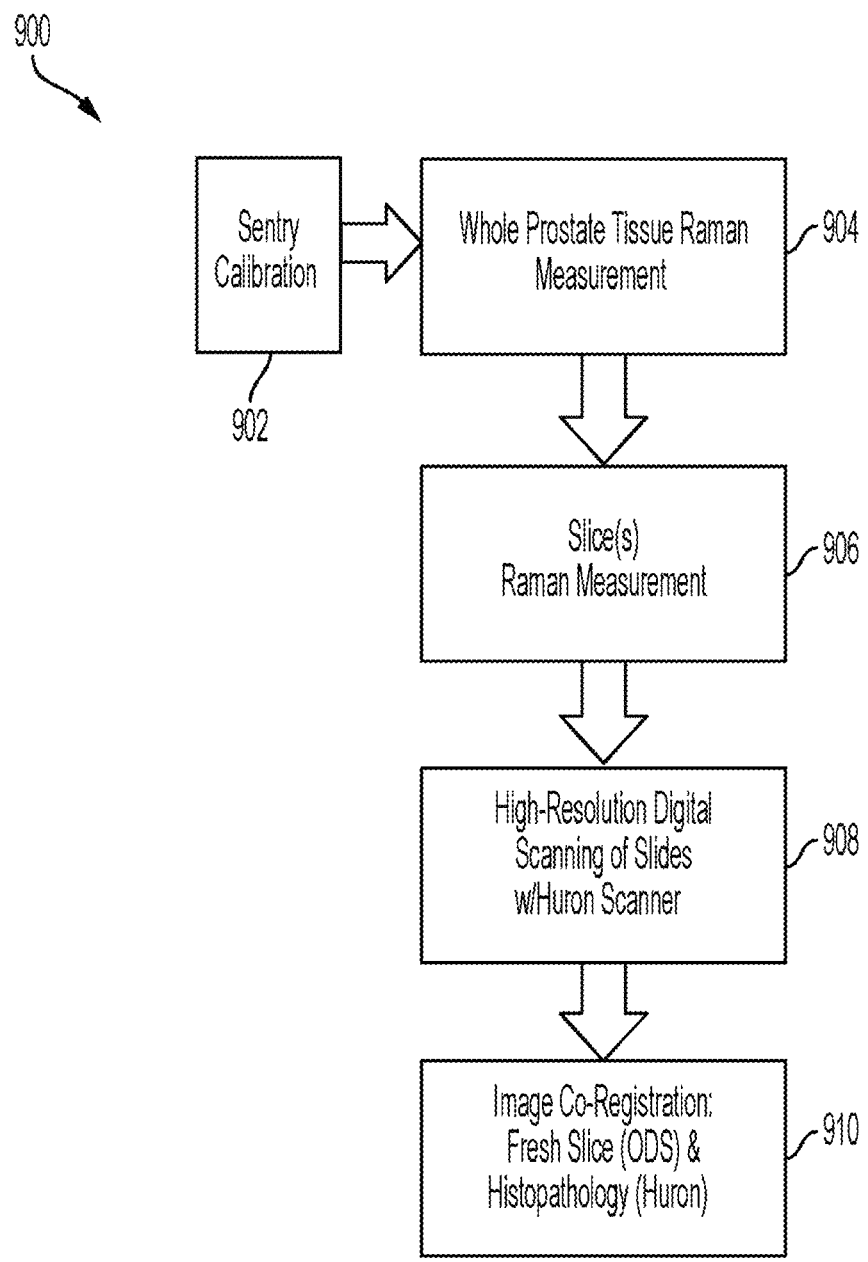
FIG. 9 show a data collection method according to examples of the present disclosure.
Figure 10:
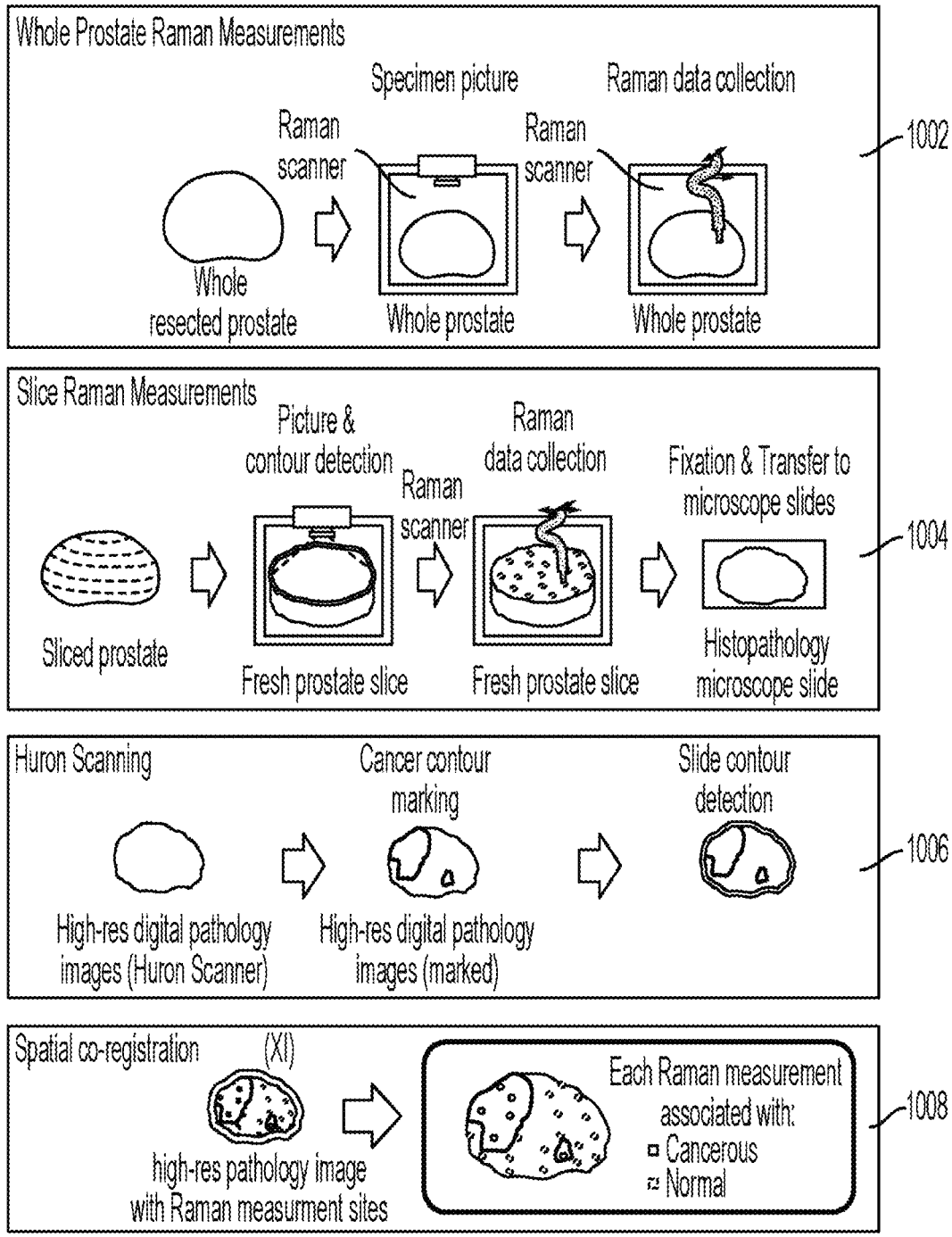
FIG. 10 shows examples processes of FIG. 9.

FIG. 9 show a data collection method 900 according to examples of the present disclosure. FIG. 10 shows examples processes of FIG. 9. Method 900 begins by performing a calibration process, as in 902, and as described above with regard FIG. 5. Method 900 continues by performing a Raman measurement on a tissue sample, as in 904 and 1002. For example, a whole tissue sample is placed in the tissue holder (jig), such as shown in FIGS. 8A and 8B. The computer obtains a high-resolution 3D image. The computer displays a top down view of the tissue specimen. Interactively, the software allows the user to select one or more locations for Raman measurement. The software places a crosshair on the image. The software moves the probe to the measurement site and makes one or more Raman measurements. The process is repeated as desired by the user. Method 900 continues by slicing each Raman measurement, as in 906 and 1004. Continuing with the example, the user, such as a pathologist, slices the tissue specimen. The user places a single slice of the tissue on the tissue holder. Method 900 continues by performing a high-resolution digital scan of slides containing portions of the tissue sample with a scanner, such as a Huron scanner, as in 908 and 1006. Continuing with the example, the software images the slice and generates contours and measurement locations to maximize tissue coverage. The software places contours and measurement site locations on the image and continues to make Raman measurements at each site. Method 900 continues by performing an image co-registration process with a fresh slice of the tissue sample and histopathology (Huron) microscope slide images, as in 910 and 1008. Continuing with the example, the software generates a mask of tissue contours and measurement sites. The software segments matching microscope slide image (histology). The software co-registers the mask and histology contour allowing each Raman measurement to associate the ground truth of tissue character at each Raman measurement site. The histology servers as the ground truth.

Figure 11:
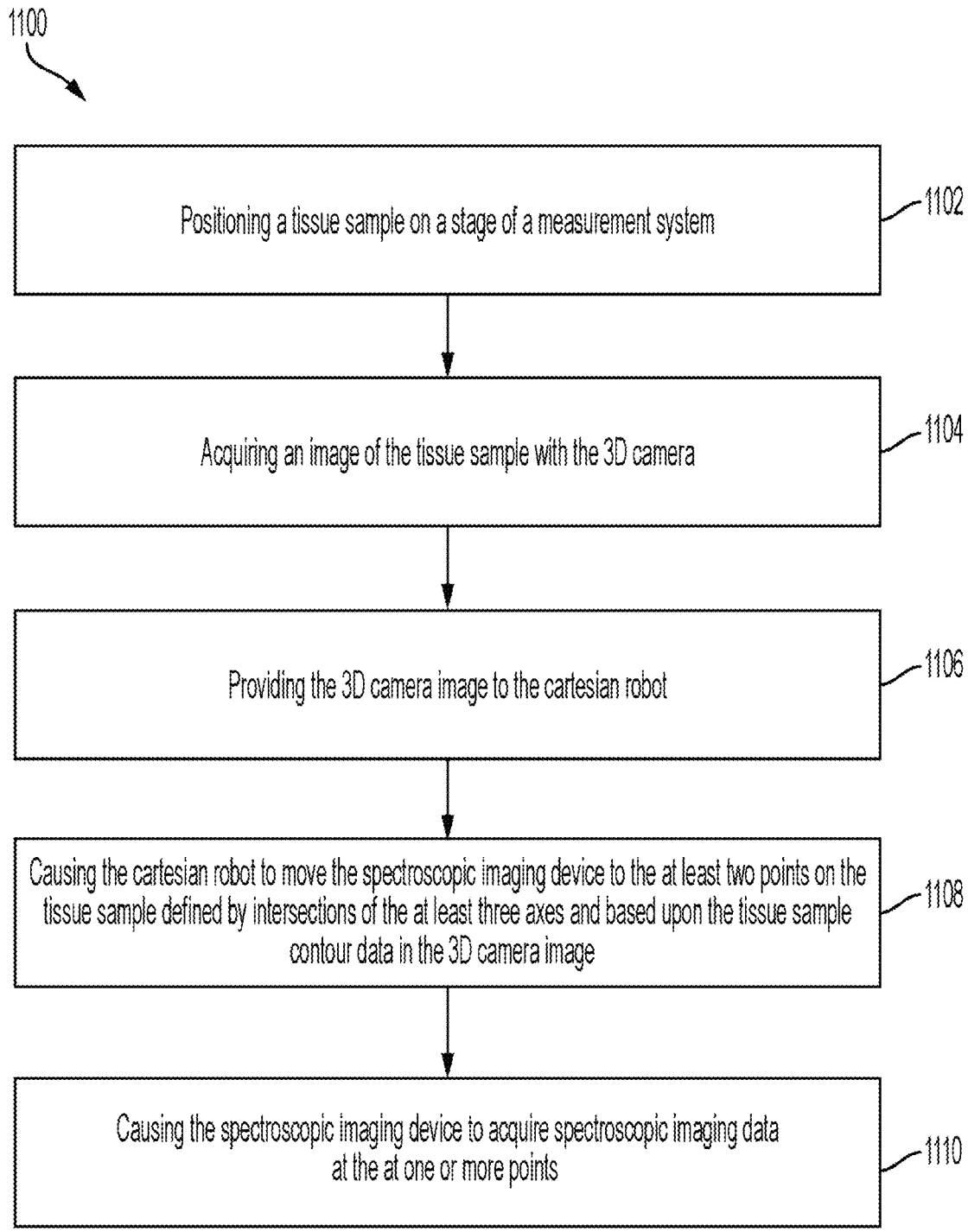
FIG. 11 shows a method of obtaining automated spectroscopy measurements of tissue according to examples of the present disclosure.

FIG. 11 shows a method 1100 of obtaining automated spectroscopy measurements of tissue according to examples of the present disclosure. Method 1100 comprises positioning a tissue sample on a stage of a measurement system, as in 1102. The measurement system can comprise a cartesian robot configured to move along at least three axes; a spectroscopic imaging device having a proximal end and a distal end with a tip, detachably connected to the cartesian robot; a high-resolution 3D camera and spectrometer; and a stage configured to be positioned under the tissue sample. The cartesian robot is configured to move the spectroscopic imaging device to at least two points on the tissue sample defined by intersections of the at least three axes and based upon tissue sample contour data in an image acquired by the 3D camera. The spectroscopic imaging device is configured to acquire spectroscopic imaging data at the at least two points.

Method 1100 continues by acquiring an image of the tissue sample with the 3D camera, as in 1104. The 3D camera image is analyzed to identify the optimal number of points for acquisition of spectroscopic imaging data that will provide optimal coverage of spectroscopy data for the tissue sample. In one non-limiting example, the 3D camera is configured to perform object segmentation. The 3D camera along with the RGB camera obtains a depth image and a RGB image, respectively. The depth image is then processed to identify the tissue sample using their natural three-dimensional geometry. This tends to provide a more accurate segmentation because the depth camera is not prone to error or limitations caused by lighting or reflections. The segmentation bounds are then mapped to the RGB.

Method 1100 continues by providing the 3D camera image to the cartesian robot, as in 1106. The 3D camera image is analyzed to identify the optimal number of points for acquisition of spectroscopic imaging data that will provide optimal coverage of spectroscopy data for the tissue sample. Continuing with the example, prior to obtaining the inner contours, the outer/external contours are obtained. The is performed as follows. The first step involves a camera calibration. Tissue samples on the load cell plate are captured with a vertically mounted camera looking downwards. The capture image is a pseudo-to view of the tissue sample. Since the viewing angle is not exactly orthogonal to the load cell plate, there is an apparent distortion in the captured image. Hence, the distorted image is corrected using the camera calibration parameters to obtain an undistorted image for further processing. The second step involves image normalizations. Images are normalized to maintain uniformity in scale and size. The third step involves image preprocessing. The image preprocessing provides for one or more of: noise removal, color correction, light reflection, or shadow removal. The fourth step involves adaptive thresholding for image binarization. This is used for generating masks needed for tissue extraction, i.e., to segment the tissue sample from the background, such as a checkerboard pattern, sample holding plate, and image markers. The fifth step involves masking. Mask generation and segmentation reduces in scope the region of interest to perform sample contour extraction. The sixth step involves external contour extraction. After the previous five steps, the image of the tissue sample can been seen alone and the contour extraction algorithm is configured to obtain the numerous (x,y) locations of the external contour in cartesian coordinates. The seventh step involves shape identification. The external contours help in identifying a closed shape geometrical polygon. The polygon is then evaluated to determine whether it is concave or circular in shape. Based on the determination, one of two methods are used to identify inner concentric contours.

The inner contours detection method is as follows. It is noted that the concavity of the tissue samples are the corner cases. This method applies to cases where the tissue samples are resected irregularly. It is also possible to have such cases while placing on the sample tray holder. The first step involves a cartesian to polar coordinate conversion if the tissue is mostly circular. Since resizing the image at every iteration is a computationally expensive task, the information from the outer contour and the bounding box information is used to obtain the centroid. Sampling points are then identified that are spaced uniformly while keeping a minimum distance, i.e., 3 mm or as required by the application, for probe movement resolution as a constraint. For each point, the rho ($\rho$) and theta ($\theta$) with respect to the center in the polar co-ordinate system are identified. The rho ($\rho$) is reduced for each point at each iteration. This approach can save considerable time and computation overhead and provides more control on angular and radial resolution. The second step involves contour shrinking/erosion algorithm if the tissue is non-circular and exhibits concavity. The outermost boundary is obtained using the contour detection techniques as described above. The external contour is temporarily converted to polar coordinates to identify the maximum possible rho ($\rho$) iterations. This provides the number of inner contours that can be optimally placed on the tissue. The image is then used to generate a morphological mask. This mask is then eroded iteratively by a structuring element. After each iteration, a new and reduced outer mask is obtained. The shrinkage is guided by rho ($\rho$). Consolidating all the contours, the original external contours are generated along with all the inner contours.

Method 1100 continues by causing the cartesian robot to move the spectroscopic imaging device to the at least two points on the tissue sample defined by intersections of the at least three axes and based upon the tissue sample contour data in the 3D camera image, as in 1108.

Method 1100 continues by causing the spectroscopic imaging device to acquire spectroscopic imaging data at the one or more points, as in 1110.

Figure 11B:
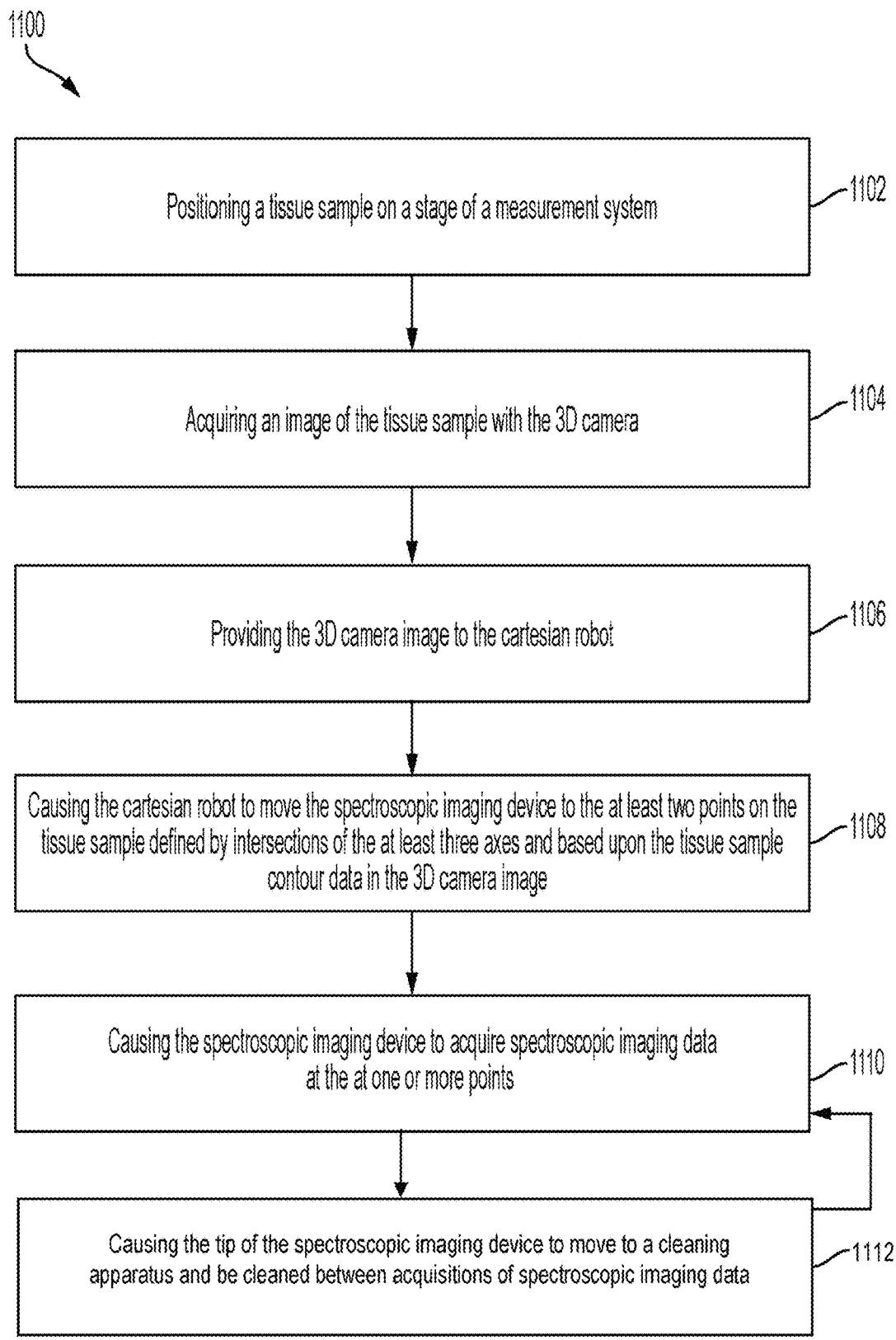
FIG. 11B shows another method of obtaining automated spectroscopy measurements of tissue according to examples of the present disclosure.

In an optional step, as shown in FIG. 11B, in the case where spectroscopic imaging data is acquired from more than one point, method 1100 continues by causing the tip of the spectroscopic imaging device to move to a cleaning apparatus and be cleaned between acquisitions of spectroscopic imaging data, as in 1112.

Figure 12:
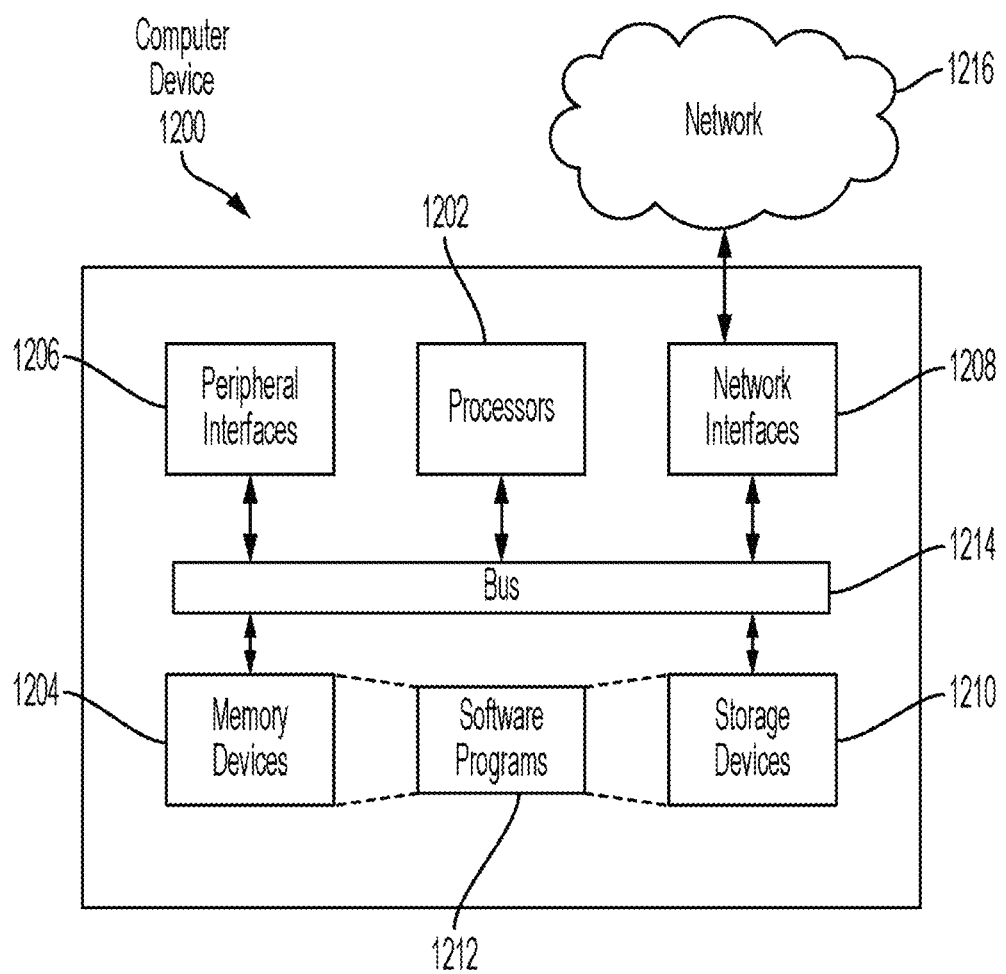
FIG. 12 is an example of a hardware configuration for a computer device, which can be used to perform one or more of the processes described herein.

FIG. 12 is an example of a hardware configuration for a computer device 1200, which can be used to perform one or more of the processes described above. The computer device 1200 can be any type of computer devices, such as desktops, laptops, servers, etc., or mobile devices, such as smart telephones, tablet computers, cellular telephones, personal digital assistants, etc. As illustrated in FIG. 12, the computer device 1200 can include one or more processors 1202 of varying core configurations and clock frequencies. The computer device 1200 can also include one or more memory devices 1204 that serve as a main memory during the operation of the computer device 1200. For example, during operation, a copy of the software that supports the above-described operations can be stored in the one or more memory devices 1204. The computer device 1200 can also include one or more peripheral interfaces 1206, such as keyboards, mice, touchpads, computer screens, touchscreens, etc., for enabling human interaction with and manipulation of the computer device 1200.

The computer device 1200 can also include one or more network interfaces 808 for communicating via one or more networks, such as Ethernet adapters, wireless transceivers, or serial network components, for communicating over wired or wireless media using protocols. The computer device 1200 can also include one or more storage devices 1210 of varying physical dimensions and storage capacities, such as flash drives, hard drives, random access memory, etc., for storing data, such as images, files, and program instructions for execution by the one or more processors 1202.

Additionally, the computer device 1200 can include one or more software programs 1212 that enable the functionality described above. The one or more software programs 1212 can include instructions that cause the one or more processors 1202 to perform the processes, functions, and operations described herein, for example, with respect to the process of FIGS. 5 and 9-11. Copies of the one or more software programs 1212 can be stored in the one or more memory devices 1204 and/or on in the one or more storage devices 1210. Likewise, the data utilized by one or more software programs 1212 can be stored in the one or more memory devices 1204 and/or on in the one or more storage devices 1210. Peripheral interface 1206, one or more processors 1202, network interfaces 1208, one or more memory devices 1204, one or more software programs, and one or more storage devices 1210 communicate over bus 1214.

In implementations, the computer device 1200 can communicate with other devices via a network 1216. The other devices can be any types of devices as described above. The network 1216 can be any type of network, such as a local area network, a wide-area network, a virtual private network, the Internet, an intranet, an extranet, a public switched telephone network, an infrared network, a wireless network, and any combination thereof. The network 1216 can support communications using any of a variety of commercially-available protocols, such as TCP/IP, UDP, OSI, FTP, UPnP, NFS, CIFS, AppleTalk, and the like. The network 1216 can be, for example, a local area network, a wide-area network, a virtual private network, the Internet, an intranet, an extranet, a public switched telephone network, an infrared network, a wireless network, and any combination thereof.

The computer device 1200 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1200 as described above need not be enclosed within a single enclosure or even located in close proximity to one another. Those skilled in the art will appreciate that the above-described componentry are examples only, as the computer device 1200 can include any type of hardware componentry, including any necessary accompanying firmware or software, for performing the disclosed implementations. The computer device 1200 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

What is claimed is:

1. A system for automated spectroscopy measurements of ex vivo tissue comprising:
   a cartesian robot configured to move along at least three axes;
   a spectroscopic imaging device having a proximal end and a distal end with a tip, detachably connected to the cartesian robot;
   a high-resolution 3D imaging system;
   a spectrometer; and
   a stage configured to be positioned under a tissue sample,
   a pressure sensor configured to detect contact of the tip of the spectroscopic imaging device with the tissue sample and to provide feedback information to dynamically adjust a position of the spectroscopic imaging device,
   whereby the cartesian robot is configured to move the spectroscopic imaging device to at least one point on the tissue sample defined by intersections of the at least three axes and based upon tissue sample contour data in an image acquired by the 3D imaging system and according to the feedback information provided by the pressure sensor; and
   whereby the spectroscopic imaging device is configured to acquire spectroscopic imaging data at the at least two points.

2. The system of claim 1, wherein the stage comprises the pressure sensor.

3. The system of claim 1, wherein the pressure sensor is configured to provide the feedback information to the cartesian robot or to the spectroscopic imaging device, or both, when the pressure sensor detects that the spectroscopic imaging device has made contact with the tissue sample.

4. The system of claim 3, wherein the feedback information comprises a trigger for the spectroscopic imaging device to acquire spectroscopic imaging data, or an instruction to the cartesian robot to pause movement, or both.

5. The system of claim 1, wherein the spectroscopic imaging device incorporates a Raman spectroscopy probe and the spectroscopic imaging data comprises Raman spectra.

6. The system of claim 5, further comprising a computer and associated software designed to interpret the Raman spectra and provide individual histopathological assessments corresponding to the at least two points on the tissue sample.

7. The system of claim 6, wherein the individual histopathological assessments may include cancer status.

8. The system of claim 1, further comprising a marking device for marking the tissue sample adjacent to the tip of the spectroscopic imaging device, configured to place a mark on the tissue sample each time spectroscopic imaging data is acquired.

9. The system of claim 1, further comprising a cleaning apparatus for cleaning the tip of the spectroscopic imaging device between automated spectroscopy measurements.

10. The system of claim 1, wherein the tissue sample is at least 1 cm square in size.

11. A method of obtaining automated spectroscopy measurements of ex vivo tissue comprising:
   positioning a tissue sample on a stage of a measurement system comprising:
      a cartesian robot configured to move along at least three axes;
      a spectroscopic imaging device having a proximal end and a distal end with a tip, detachably connected to the cartesian robot;
      a high-resolution 3D camera and spectrometer; and
      a stage configured to be positioned under the tissue sample,
      a pressure sensor configured to detect contact of the tip of the spectroscopic imaging device with the tissue sample and to provide feedback information to dynamically adjust a position of the spectroscopic imaging device,
      whereby the cartesian robot is configured to move the spectroscopic imaging device to at least two points on the tissue sample defined by intersections of the at least three axes and based upon tissue sample contour data in an image acquired by the 3D camera and according to the feedback information provided by the pressure sensor; and
      whereby the spectroscopic imaging device is configured to acquire spectroscopic imaging data at the at least two points,
   acquiring an image of the tissue sample with the 3D camera;
   providing the 3D camera image to the cartesian robot;
   causing the cartesian robot to move the spectroscopic imaging device to the at least two points on the tissue sample defined by intersections of the at least three axes and based upon the tissue sample contour data in the 3D camera image; and
   causing the spectroscopic imaging device to acquire spectroscopic imaging data at the at least two points.

12. The method of claim 11, wherein the 3D camera image is analyzed to identify the optimal number of points for acquisition of spectroscopic imaging data that will provide optimal coverage of spectroscopy data for the tissue sample.

13. The method of claim 11, further including the step of causing the tip of the spectroscopic imaging device to be cleaned between acquisitions of spectroscopic imaging data at the at least two points.

* * * * *